United States Patent
Ikeda et al.

(10) Patent No.: US 6,371,854 B1
(45) Date of Patent: Apr. 16, 2002

(54) COMBINED GAME SYSTEM

(75) Inventors: Akio Ikeda; Toshikazu Tomizawa, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/639,234

(22) Filed: Aug. 16, 2000

Related U.S. Application Data
(60) Provisional application No. 60/178,317, filed on Jan. 27, 2000.

(30) Foreign Application Priority Data

Aug. 20, 1999 (JP) .......................................... 11-234238

(51) Int. Cl.⁷ ............................................... A63F 13/00
(52) U.S. Cl. .............................. 463/42; 463/40; 463/43
(58) Field of Search .......... 463/40, 42; 340/500–500.4, 340/568.4, 661, 870.16; 395/500

(56) References Cited

U.S. PATENT DOCUMENTS

| | | |
|---|---|---|
| 4,072,310 A | 2/1978 | Beam |
| 4,168,796 A | 9/1979 | Fulks et al. |
| 4,572,509 A | 2/1986 | Sitrick |
| 4,695,946 A | 9/1987 | Andreasen et al. |
| 4,858,930 A | 8/1989 | Sato |
| 4,905,280 A | 2/1990 | Wiedemer |
| 5,043,887 A | 8/1991 | Richardson |
| 5,048,831 A | 9/1991 | Sides ........................ 273/85 |
| 5,119,295 A | 6/1992 | Kapur |
| 5,184,830 A | 2/1993 | Okada ........................ 273/434 |
| 5,240,249 A | 8/1993 | Czarnecki et al. ............ 273/83 |
| 5,343,461 A | 8/1994 | Barton et al. |
| 5,349,689 A | 9/1994 | Suzuki |
| 5,350,176 A | 9/1994 | Hochstein et al. |
| 5,367,394 A | 11/1994 | Chuter et al. |
| 5,393,072 A | 2/1995 | Best ........................... 273/434 |
| 5,393,073 A | 2/1995 | Best |
| 5,396,225 A | 3/1995 | Okada ................... 340/825.21 |
| 5,408,408 A | 4/1995 | Marsico, Jr. |
| 5,428,528 A | 6/1995 | Takenouchi et al. |
| 5,440,565 A | 8/1995 | Miyamoto et al. |
| 5,581,712 A | 12/1996 | Herrman |
| 5,618,045 A | 4/1997 | Kagan et al. |
| 5,702,305 A | 12/1997 | Norman et al. |
| 5,727,170 A | 3/1998 | Mitchell et al. |
| 5,759,100 A | 6/1998 | Nakanishi ..................... 463/37 |
| 5,762,555 A | 6/1998 | Crump et al. ................. 463/41 |
| 5,795,228 A | 8/1998 | Trumbull et al. |
| 5,828,862 A | 10/1998 | Singkornrat et al. ........ 395/442 |
| 5,876,351 A | 3/1999 | Rohde ........................ 600/523 |

(List continued on next page.)

FOREIGN PATENT DOCUMENTS

| | | |
|---|---|---|
| GB | 2232087 A | 12/1990 |
| GB | 2287629 A | 9/1995 |
| JP | 4-266781 | 9/1992 |
| JP | 6-61390 | 8/1994 |
| JP | 411226257 A | 4/1999 |

OTHER PUBLICATIONS

Game Boy Game Link Cable.

Primary Examiner—Jessica J. Harrison
Assistant Examiner—Alex Rada
(74) Attorney, Agent, or Firm—Nixon & Vanderhye P.C.

(57) ABSTRACT

A combined game system includes a portable game machine and another type of video game machine. The portable game machine and the other type of video game machine are connected through a game cartridge and communication cable. The portable game machine includes an LCD, and the other video game machine is connected to a CRT. When a player operates an operating device provided with the portable game machine, change is caused in a discrete game picture displayed on the LCD and in a common game picture displayed on the CRT. In the event that the communication cable is removed from the video game machine during playing a game, the CPU displays an, alert message on the LCD while the CPU displays an alert message on the CRT.

16 Claims, 14 Drawing Sheets

U.S. PATENT DOCUMENTS

| | | |
|---|---|---|
| 5,971,855 A | 10/1999 | Ng |
| 5,976,015 A | 11/1999 | Seelig et al. |
| 5,991,530 A * | 11/1999 | Okada et al. .......... 395/500.46 |
| 5,991,839 A | 11/1999 | Ninomiya |
| 6,007,428 A | 12/1999 | Nishiumi et al. |
| 6,009,538 A | 12/1999 | Goodwin, III et al. |
| 6,042,476 A | 3/2000 | Ohashi et al. |
| 6,042,478 A | 3/2000 | Ng ............................. 463/44 |
| 6,056,640 A | 5/2000 | Schaaij |
| 6,071,194 A | 6/2000 | Sanderson et al. ............ 463/37 |
| 6,083,104 A | 7/2000 | Choi ............................ 463/6 |
| 6,085,268 A | 7/2000 | Lee et al. |
| 6,098,138 A | 8/2000 | Martinelli et al. |
| 6,115,765 A | 9/2000 | Lee |
| 6,126,547 A | 10/2000 | Ishimoto ...................... 463/42 |
| 6,132,315 A * | 10/2000 | Miyamoto et al. |
| 6,135,887 A | 10/2000 | Pease et al ................... 463/42 |
| 6,139,434 A | 10/2000 | Miyamoto et al. |
| 6,145,035 A | 11/2000 | Mai et al. |
| 6,165,068 A | 12/2000 | Sonoda et al. ................. 463/8 |
| 6,168,524 B1 | 1/2001 | Aoki et al. .................. 463/31 |

* cited by examiner

FIG. 5

| ADDRESS | D7 | D6 | D5 | D4 | D3 | D2 | D1 | D0 |
|---|---|---|---|---|---|---|---|---|
| A000h ~ A01Fh BUFFER RAM AREA | BUFFER RAM (32 BYTES) AREA ||||||||
| A020h BUFFER RAM DATA CRC | BUFFER RAM_DATA CRC ||||||||
| A021h ~ BFDFh USE-PROHIBITED AREA | USE PROHIBITED ||||||||
| BFE0h ~ BFE3h N64 DATA COM PORT | N64 COMMUNICATION PORT (4 BYTES) AREA ||||||||
| BFE4h ~ BFEFh USE-PROHIBITED AREA | USE PROHIBITED ||||||||
| BFF0h ~ BFF3h GB DATA COM PORT | GB COMMUNICATION PORT (4 BYTES) AREA ||||||||
| BFF4h ~ BFFDh USE-PROHIBITED AREA | USE PROHIBITED ||||||||
| BFFEh MBC4 STATUS | | | | | BUFFER RAM DATA CRC ERROR | GENERAL-PURPOSE FLAG 0 | GB COM PORT WRITE | GB WRITE |
| BFFFh MBC4 STATUS | N64 DETECT FLAG | | | | N64 RE-TRANSMIT FLAG | GENERAL-PURPOSE FLAG 1 | N64 COM PORT WRITE | N64 WRITE |

COMBINED GAME SYSTEM

This appln claims benefit of Prov. No. 60/178,317 filed Jan. 27, 2000.

FIELD OF THE INVENTION

The present invention relates generally to combined game systems. More particularly, the invention relates to a combined game system having a video game machine connected to a common display and at least one portable game machine having a discrete display so that they are connected through a communication cable to enable communication of data to be processed for playing a game.

BACKGROUND AND SUMMARY OF THE INVENTION

The are conventional combined game systems having two or more game machines connected one to another to enable a game to play, as disclosed in Japanese Patent Laid-open No. S60-119977 (Prior art 1), Japanese Patent Laid-open No. H4-266781 (Prior art 2) and Japanese Utility Model Laid-open No. S61-171992 (Prior art 3).

Prior art 1 and Prior art 2 each use a portable game machine as a peripheral to a personal computer or video game machine so that a game can be controlled using operating switches provided on the portable game machine. Prior art 3 includes four game machines connected to a central processor to enable data transfer or communication for a game to be played on the game machines.

Prior art 1 and Prior art 2 describe a game using a portable and another type of video game machine, but do not disclose details of data transmission and reception to be made between these portable and video game machines. Prior art 3 describes communication through a transmission media but fails to describe data transmission and reception to be made between the game machines.

It is often the case where a player who is absorbed in a game unintentionally but forcefully pulls his or her own portable game machine, or a player who is moving through interconnected video and portable game machines has his or her foot caught, thereby causing a poor connection, or removal of the communication cable connection. However, Prior art 1, 2, and 3 each fail to disclose technology where a player during game play is modified of cable removal, disconnection or the like or includes technology for assuring the reliability of communication or transmission.

SUMMARY OF THE INVENTION

It is therefore a primary feature of the exemplary embodiments to provide a combined game system which is capable of immediately notifying a user as to the occurrence of a poor cable connection.

Another feature of the exemplary embodiments is to provide a combined game system which can enhance the reliability of communication or data transfer made between portable and video game machines.

In accordance with one aspect of the exemplary embodiments, a combined game system is described having a video game machine connected to a common display and at least one portable game machine having a discrete display, which machines are connected through a communication cable to communicate data for game processing, wherein at least one of the portable game machine and the video game machine comprises: a first connection problem detector to detect whether a poor connection occurred on the communication cable; and a first alert message display message generator to display a first alert message on at least one of the discrete display and the common display when the poor connection occurred.

In accordance with a second aspect of the exemplary embodiments, a combined game system is described having a video game machine connected to a common display and at least one portable game machine having a discrete display which machines are connected through a communication cable to communicate data for game processing, wherein the portable game machine comprises: an operating device to play a game; first processing circuitry to perform predetermined processing according to operation of the operating device; first write circuitry to write a first processing result of the first processing circuitry to a buffer memory; first setting means to set a first flag to a first state when the first processing result is written to the buffer memory; a first receiver to receive a transmission request from the video game machine; a first transmitter to transmit to the video game machine the first processing result and state information of the first flag in response to the transmission request; second setting means to set the first flag to a second state when the first processing result is transmitted from the buffer memory to the video game machine; disabling means to disable the first write circuitry when the first flag is in the first state; and enabling means to enable the first write circuitry when the first flag is in the second state.

According to the first aspect of the exemplary embodiments, connection is made through a communication cable between the video game machine connected to the common display and the at least one portable game machine. The data for game processing is communicated between the portable game machine and the video game machine. In at least one of the portable game machine and the video game machine, the first connection problem detector detects whether a poor connection occurred on the communication cable or not. In an event of occurrence of a poor connection, the first alert message display message generator displays a first alert message on at least one of the discrete display and the common display.

In one embodiment of the invention, a first return message display message generator is provided in at least one of the portable game machine and the video game machine. The first return message display message generator displays a first return message on at least one of the discrete display and the common display when the poor connection is eliminated.

In one aspect of the exemplary embodiments, the one game machine is the portable game machine and the one display is the discrete display. In this case, the portable game machine further uses a flag which varies depending upon a connection state of the communication cable. The first connection problem detector detects based upon a state of the flag.

In another aspect of the exemplary embodiments, the one game machine is the video game machine and the one display is the common display. In this case, the video game machine further comprises output circuitry to output a data transmission request to the portable game machine. The first connection problem detector detects based upon transmission data responsive to the data transmission request from the portable game machine.

In one embodiment of the invention, the portable game machine comprises a second connection problem detector and a second alert message display message generator. The second connection problem detector detects whether a poor connection occurred on the communication cable or not, and the second alert message display message generator displays a second alert message on the discrete display when the poor connection occurred.

In another embodiment of the invention, a plurality of portable game machines are connected respectively through plurality of communication cables to the video game machine. The first connection problem detector detects on one portable game machine at a time.

Where an alert message signal transmitter is provided on the video game machine and a third alert message display message generator on the portable game machine is provided, the alert message signal transmitter transmits an alert message signal to a portable game machine in a good connection state when the poor connection occurred to any of the portable game machines. The third alert message display message generator displays an alert message on the discrete display based upon the alert message signal.

Also, where a return message signal transmitter is provided on the video game machine and a third return message display message generator on the portable game machine is provided, the return message signal transmitter transmits a return message signal to a portable game machine in a good connection state when the poor connection is eliminated to any of the portable game machines. The third return message display message generator displays a return message on the discrete display based upon the return message signal.

In another aspect of the exemplary embodiments, in the portable game machine, a key input signal creating arrangement creates a key input signal according to operation of the operation key, and a first transmitter transmits the key input signal to the video game machine. In the video game machine, a second receiver receives the key input signal, and a second display generator displays on the common display a common game picture based upon the key input signal. The discrete game picture signal creating arrangement creates the discrete game picture signal based on the key input signal. The second transmitter transmits the discrete game picture signal to the portable game machine. The transmitted discrete game picture signal is received by a first receiver provided on the portable game machine. A corresponding picture to the received discrete game picture signal is displayed on the discrete display.

In one embodiment of the invention, the portable game machine comprises a first storage medium to store a game program for the portable game machine, and the key input signal creating arrangement creates the key input signal based upon operation of the operating key and the portable game machine game program. The video game machine comprises a second storage medium to store a video game machine game program, and the discrete game picture signal creating arrangement creates the discrete game picture signal based upon the key input signal and the video game machine game program.

According to the second aspect of the exemplary embodiments, when an operating device for the portable game machine is operated, first processing circuitry processes according to the operation. The first processing circuitry has a first processing result to be written to a buffer memory by first write circuitry. If the first processing result is written to the buffer memory, first setting means set the first flag to a first state. If a first receiver receives a transmission request output from the video game machine, the first transmitter transmits the first processing result and first flag state information to the video game machine in response to the transmission request. If the first processing result is transmitted from the buffer memory to the video game machine, second setting means sets the first flag to a second state. Disabling means disables the first write means when the first flag is in the first state. Enabling means enables the first write means when the first flag is in the second state.

When the first processing result has a data amount greater than a capacity of the buffer memory, the first write circuitry writes the first processing result to the buffer memory.

In one embodiment of the invention, the portable game machine further comprises a first storage medium storing a portable game machine program, and the first processing circuitry processes based upon the portable game machine game program.

In the video game machine, the second transmitter transmits the transmission request to the portable game machine. If the first processing result and the first flag state information are transmitted from the portable game machine, second processing circuitry receives the first processing result and state information. When the first flag state information represents the first state, disabling means disables the first processing result. A common game picture display generator displays on the common display a related common game picture to a second processing result of the second processing circuitry.

In one embodiment of the invention, the video game machine further comprises a second storage medium storing a video game machine game program. In this case, the second processing circuitry processes based upon the video game machine game program.

In another embodiment of the invention, the operating device includes a transmission key to instruct transmission of the first processing result, and the write means starting to write the first processing result in response to operation of the transmission key.

According to the first aspect of the exemplary embodiments, if a poor connection occurs, a first alert message is displayed on at least one of the discrete display and the common display. Accordingly, the player can immediately know about the occurrence of a poor cable connection.

According to the second aspect of the exemplary embodiments, a first processing result is written to the buffer memory depending on a state of the first flag. The first processing result is processed depending on a state of the first flag by a second processing circuitry. This enhances the reliability of data transfer.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing a memory map of a buffer memory formed in a communication control circuit;

DETAILED DESCRIPTION OF THE PREFERRED EMBODIMENTS

Figure 1:
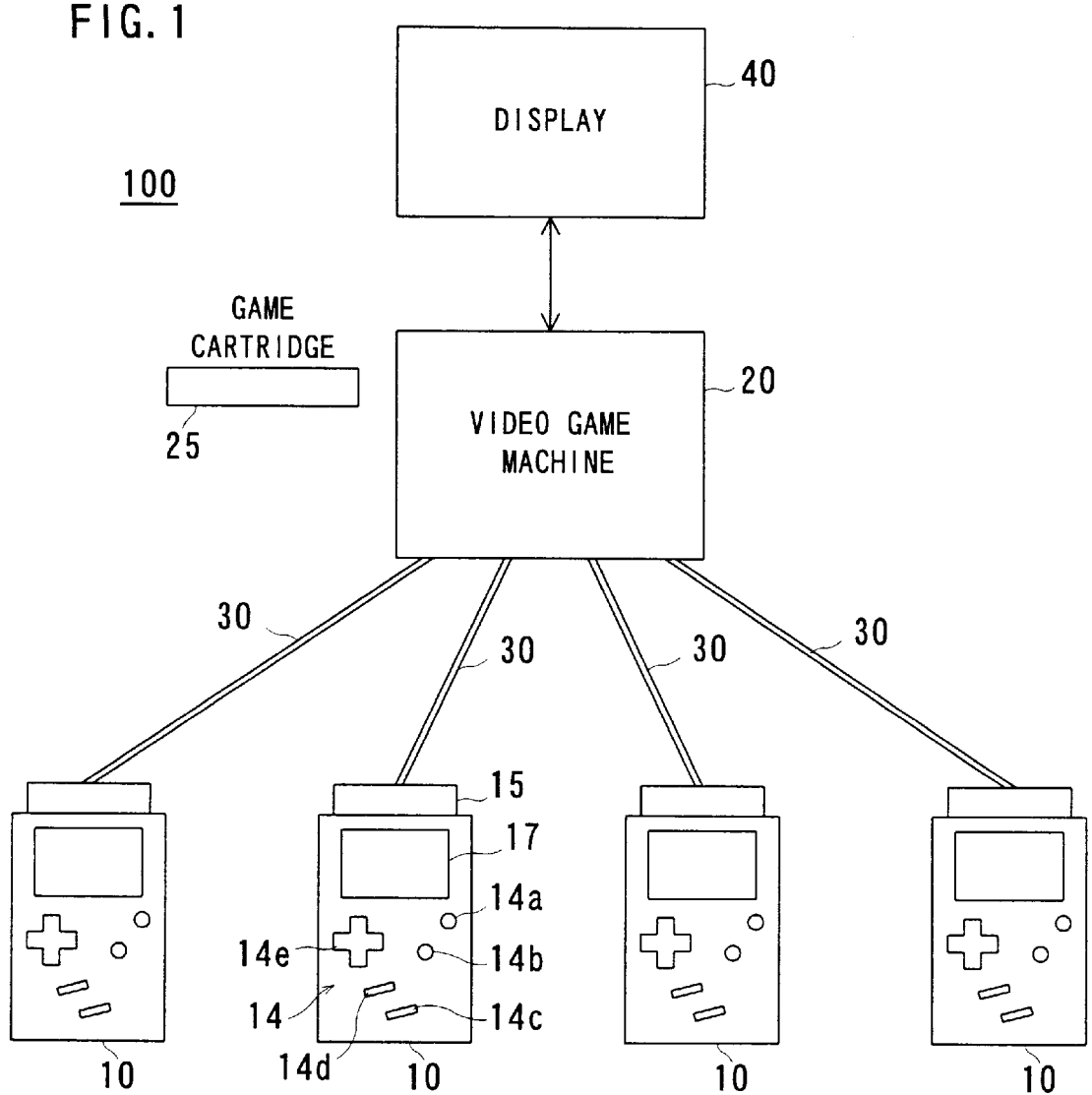
FIG. 1 is an illustrative view showing a combined game system of one embodiment of the present invention.

FIG. 1 shows an example of a combined game system 100 to which an exemplary embodiment is directed. The combined game system 100 of FIG. 1 includes a plurality (four in the embodiment) of portable game machines 10, . . . , 10 connected to a video game machine 20 through communication cables 30. The video game machine 20 is, in turn, connected to a common display, such as a CRT 40. Each player on the portable game machine 10 is allowed to play one interactive game through use of his or her own game machine 10 together with the video game machine 20 and display 40. Incidentally, the common display may use a liquid crystal display, plasma display or the like in place of the CRT.

The portable game machine herein may be the "GAMEBOY" (product name) manufactured and marketed by the present applicant. The video game machine 20 is a video game machine that adopts a 32-bit or 64-bit wide technology which is higher in processibility (e.g. in CPU bits, CPU program processibility per unit time, image representability, etc.) as compared to the portable game machines 10. The video game machine may be, for example, "Nintendo N64" (product name) manufactured and marketed by the present applicant.

The portable game machine 10 includes an LCD (Liquid Crystal Display) 17 as a discrete display and has, below the LCD 17, a button A 14a, a button B 14b, a start key 14c, a select key 14d and a direction instruct key (cross key) 14e thus forming an operating device 14. The portable game machine 10 also has a cartridge insertion recess (not shown) formed, for example, in its top end face to receive a game cartridge in the cartridge insertion hole. The communication cable 30 has one end connected to the game cartridge 15 and the other end connected to the video game machine 20.

By loading a game cartridge 25 onto the video game machine 20 and respective game cartridges 15 to the portable game machines 10, an interactive game is allowed to play wherein a virtual world video image (a common game picture between the portable game machines 10; common picture) is displayed on the CRT 40 while different parts of the virtual world are given on the respective LCDs 17 of the portable game machines 10 (game pictures unique to the respective portable game machines 10; discrete pictures).

In the case that the interactive game is a role playing game to capture a monster or search for an item or a mahjong game, each player on the portable game machine 10 may use an operating device 14 of his or her own game machine to proceed the game. That is, player on each portable game machine 10 may manipulate the operating device 14 in a manner reacting to an object in the discrete picture being displayed on the LCD 17. The key input signal to the operating device 14 is supplied to the video game machine 20. The video game machine processes each unit according to the key input signal to thereby send a discrete game picture-display signal to each portable game machine 10. Consequently, the display 40 can display a common picture to be varied by operating the operating device 14 for the portable game machine 10 while the LCD of each portable game machine 10 displays a discrete picture to be varied according to operation to the own operating device 14.

Meanwhile, where the interactive game is a horse race game to raise a race horse and make the race horse thus raised run on a racecourse, the player may raise a horse using only the portable game machine 10. Once a race horse has been raised, the player may transfer the data of the race horse to the video game machine 20 to thereby enable a horse race to play on the CRT 40. The race horse to be raised is not limited to one in number but a plurality of race horses may be raised at one time.

Figure 2:
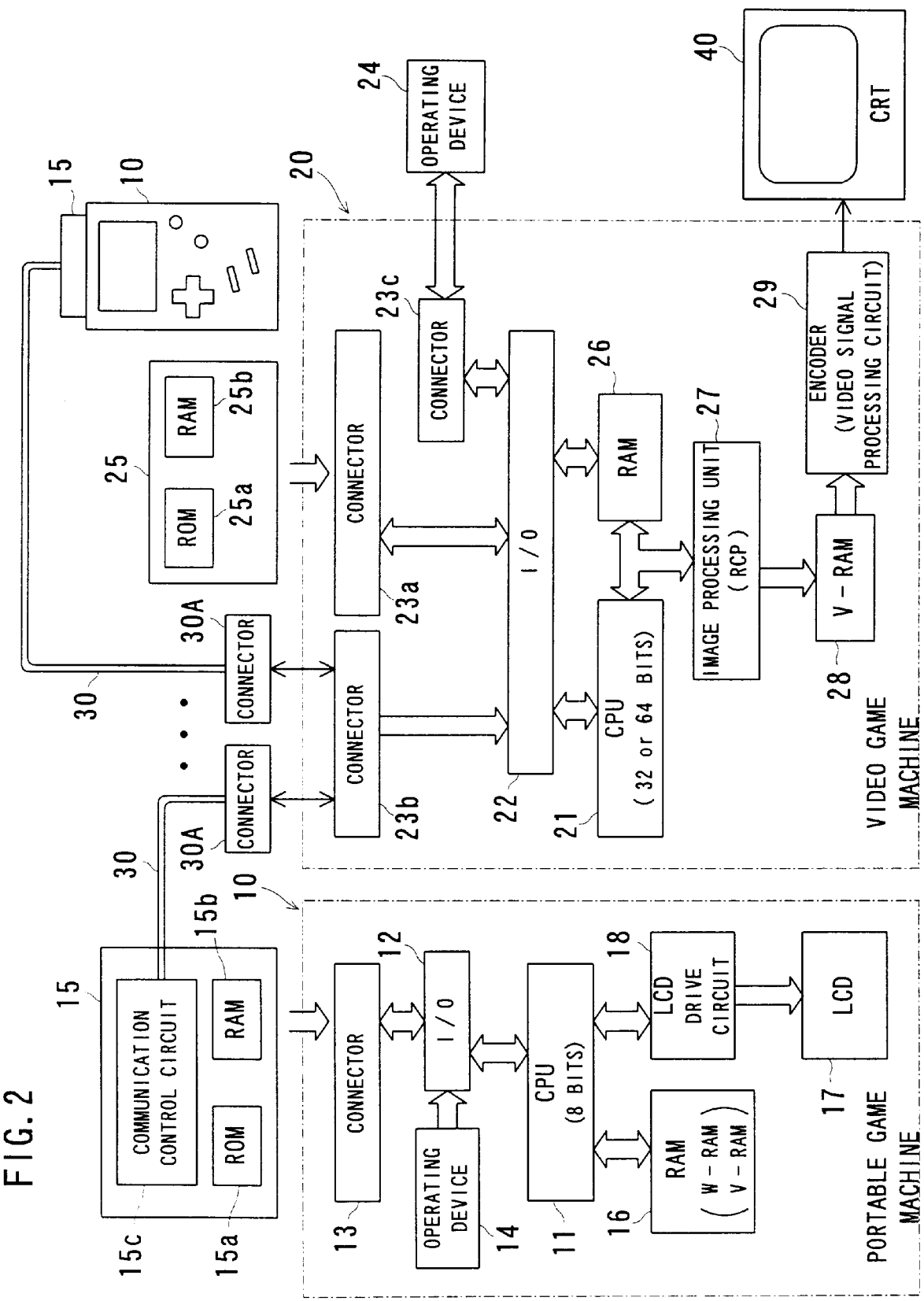
FIG. 2 is a block diagram showing the FIG. 1 embodiment.

Referring to FIG. 2, the portable game machine 10 is provided with a connector 13. To the connector 13 is detachably attached a game cartridge 15. As shown in FIG. 2, the portable game machine 10 also includes a CPU 11, for example, of 8 bits. The CPU 11 is connected with an input/output interface (hereinafter referred to as "I/O") 12. To the I/O 12 are connected a connector 13 and operating devices 14 to instruct movement or motion of game characters. Furthermore, the CPU 11 is connected with a RAM 16, such as a working RAM and display RAM, and with an LCD drive circuit 18 to control and drive the LCD 17.

The game cartridge 15 is unloadably loaded onto the portable game machine 10 through the connector 13 as described before, and includes a ROM 15a, a RAM 15b and a communication control circuit 15c. Note that the "ROM" means a concept of every nonvolatile memory including an EP-ROM, a one-time ROM, etc. Meanwhile, the "RAM" signifies a concept including every rewritable memory. Consequently, the RAM includes an EEP-ROM (E square PROM), flash memory and the like. The game cartridge 15 is mounted with such ROM 15a and RAM 15b together with a communication control circuit 15c on a circuit board (not shown). This circuit board has a plurality of connection terminals formed on one of sides thereof. By electrically connecting the connection terminals to the connector 13, the game cartridge 15 is placed into connection to the portable game machine 10, i.e. to the CPU 11.

Figure 3:
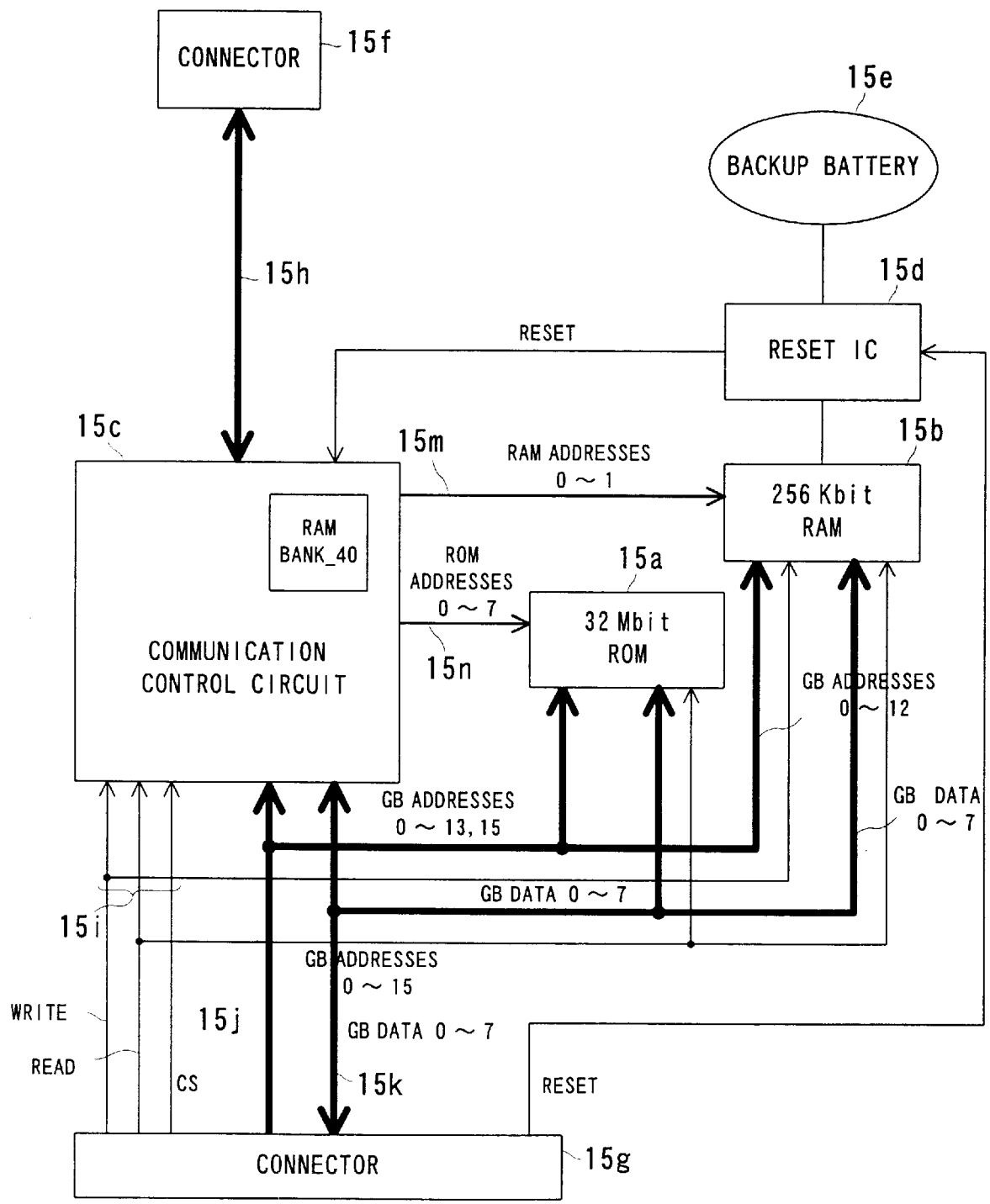
FIG. 3 is an illustrative view showing a configuration of a game cartridge.

Referring to FIG. 3, the communication control circuit 15c is connected to a connector 15g for the portable game machine 10, ROM 15a and RAM 15b through a control bus 15i, address bus 15j and data bus 15k. The communication control circuit 15c is also connected to the RAM 15b and ROM 15a through address buses 15m and 15n. If a reset signal is inputted from the portable game machine 10 through the connector 15g, the communication control circuit 15c and RAM 15b are reset by a reset IC 15d. The RAM 15b is backup by a backup battery 15e. Consequently, even after shutting down supply of power from the portable game machine 10, there is no possibility of causing breakdown of data. Incidentally, the communication control circuit 15c may be incorporated in the main body of the portable game machine 10.

Figure 4:
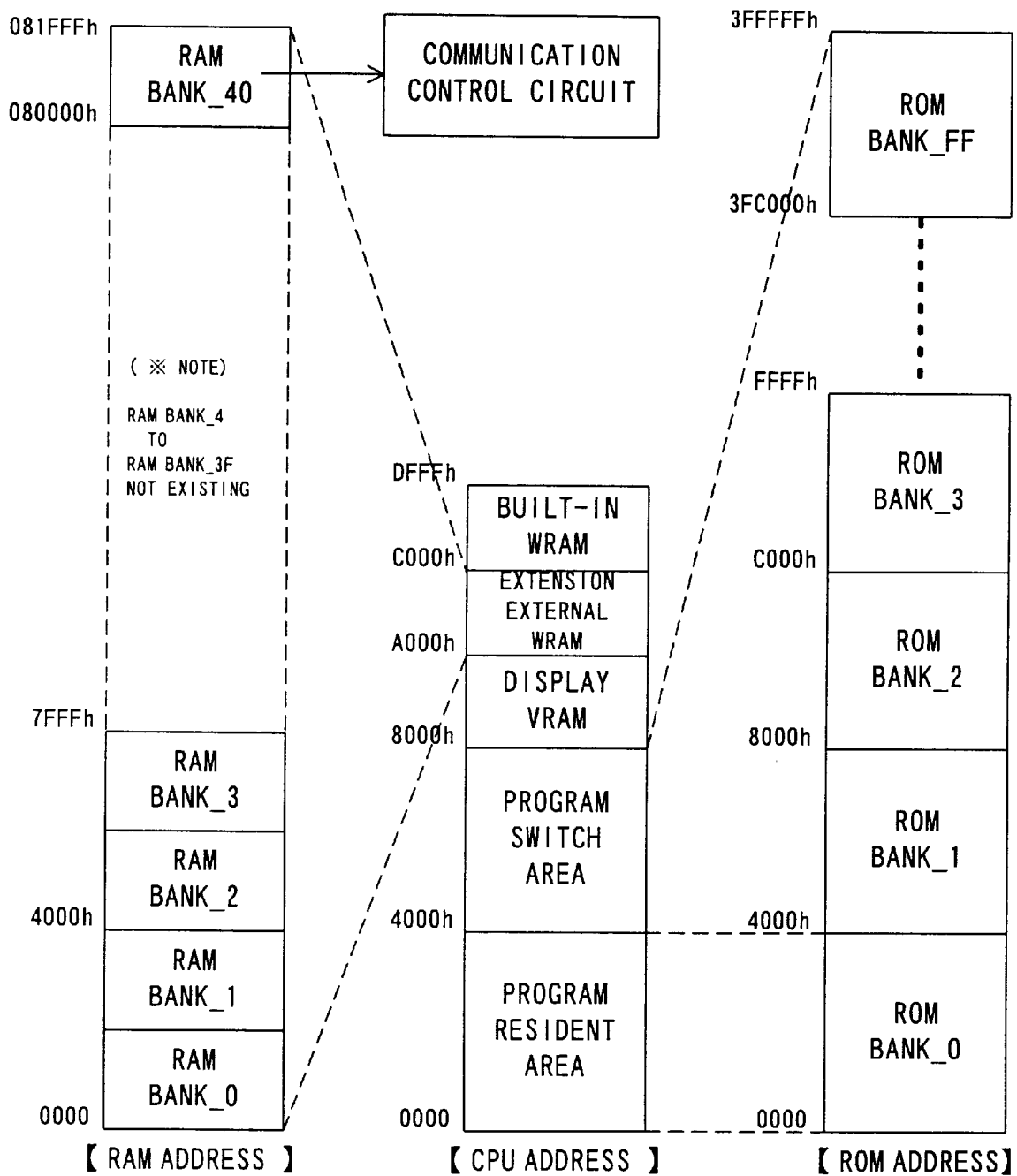
FIG. 4 is an illustrative view showing a memory map as viewed from a CPU 11.

The ROM 15a stores a game program for the portable game machine and, more concretely, is configured by a plurality of ROM banks as shown in FIG. 4. Each ROM bank previously stores a key input signal receive program to receive from the operating device 14 a key input signal representative of a state of operation of keys 14a–14e on the operating device 14, a key input signal transmit program to transmit a key input signal to the video game machine 20, a unit display program to display each unit of a game, and game title data. Meanwhile, the RAM 15b is formed with a plurality of RAM banks. Each RAM bank stores coordinate and display information of related units to the portable game machine 10 (unit information), identification codes previously set for each game cartridge 15, player names having been inputted through operating the operating device 14 by the user, acquired character data or acquired-character ability data that is to be varied depending upon progression of a game to represent progression of the game (backup data), and message data to be displayed on the LCD 17 (alert message, hook message, guide message) in accordance with a connection state of the communication cables 30 or the like.

The memory space of the CPU 11 has a program resident area (0000-3FFFh; "h" represents hexadecimal notation" to which the ROM bank 0 is allocated, and a program switch area (4000-7FFFh) to which the ROM banks 1-FF are allocated. In a case that a unit display program as above is stored on the ROM bank 0, this unit display program resides over the addresses 0000-3FFFh. Where a key input signal receive program and key input signal transmit program are stored on the ROM banks 1-FF, addresses 4000-7FFFh they are selectively allocated as required for them.

The RAM banks 0–3 are selectively allocated to an extension external WRAM area, i.e. addresses A000h–C000h of the RAM 16. Accordingly, the unit information, identification codes, player names and backup data are written, as required, to the extension external WRAM area. Such allocation for ROM and RAM banks is made possible by CPU 11 access to the ROM 15a and RAM 15b through the control bus 15i and address bus 15j to read out data therefrom via the data bus 15k.

Note that the RAM bank 40 is allocated for a buffer memory formed in the communication control circuit 15c.

The term "unit" refers to any of such objects to be processed by the portable game machine 10 and video game machine 20, as those characters to appear in a game (including a player object, enemy object and background object), items, traps, players and so on. Accordingly, the unit display program includes display position coordinates (X, Y, Z) of those to be processed and information minimally required to display the unit (e.g. character codes, item codes acquired by a player, etc.). It should however be noted that the portable game machine 10 is a two-dimensional game machine and satisfactorily requires X and Y coordinates only. However, in this embodiment the video game machine 20 is a three-dimensional display game machine wherein a Z coordinate is also calculated in the portable game machine 10 in order to display the unit on the CRT 40 through the video game machine 20.

Meanwhile, the backup data stored in the RAM 15b may be different data depending upon the genre or kind of game software. For example, in a case where the software relates to a game involving capturing an animal, imitation pet, imaginary animal (monster) or the like, raising a captured animal or the like or battling an animal captured by a player and that of his or her friends, the backup data is captured-character data to specify a captured character, captured-character ability data, or data representative of tricks usable in battling. Also, where the game is a role playing game, the backup data is data concerning the kind and number of acquired items, magic to be used, experience values, life, etc. Furthermore, where the game in kind is a baseball game as an example of a sports game, the backup data may be past batting average, homerun count, stolen base count, error average, earned run average, strikeout count for each team athlete, and batting power, running power and pitched-ball speed depending upon training conditions, etc. For a card game, the backup data includes data of card hands of each player on the portable game machine 10, or the like.

The buffer memory (RAM bank 40) of the communication control circuit 15c is formed, as shown in FIG. 5, a buffer RAM area, a buffer RAM data CRC area, an N64 communication port area, and a GB communication port area and a status area. The portable game machine 10 can directly access the RAM bank 40 configured as above. On the other hand, the video game machine 20 accesses the RAM bank 40 by issuing a desired command and through the communication control circuit 15c.

On the buffer RAM area, 32 bytes of game processing data (32-byte data) is written that is to be transmitted and received between the portable game machine 10 and the video game machine 20. On the buffer RAM data CRC area, the check sum data for the 32-byte data is written. That is, when data is transferred in order to proceed a game, the 32-byte data is first outputted and the check sum data for the 32-byte data is then outputted. The check sum data is a result of CRC calculation on the 32-byte data. For communication from the video game machine 20 to the portable game machine 10, the video game machine 20 calculates a check sum and the communication control circuit 15c of the portable game machine 10 performs an error check therefor. Meanwhile, for communication from the portable game machine 10 to the video game machine 20, the communication control circuit 15c calculates a check sum and the video game machine 20 performs an error check therefor.

The N64 communication port data can be written to the N64 communication port area exclusively by the video game machine 20, which is impossible by the portable game machine 10. The portable game machine 10 can merely read out N64 communication port data. Conversely, the GB communication port data can be written to the GB communication port area exclusively by the portable game machine 10, i.e. the video game machine 20 cannot read out GB communication port data. Any communication port data is transmitted and received before beginning transfer of game processing data.

It should however be noted that the GB communication port area and the N64 communication port area are usually used before transferring game processing data. Consequently, when transferring game processing data in amount of 32 bytes or greater at one time, a surplus part of game processing data may be divided to the GB communication port area and/or N64 communication port area.

On the status area are provided a GB write flag, an N64 write flag, a GB communication port write flag, an N64 communication port write flag, a general-purpose flag 0, a general-purpose flag 1, a buffer RAM data CRC error flag, an N64 recording-send flag and an N64 detect flag.

The GB write flag assumes "1" when the portable game machine 10 completes writing of 32-byte data to the buffer RAM area and check sum data to the buffer RAM data CRC area, and "0" when the video game machine 20 completes reading of 32-byte data and check sum data respectively out of the buffer RAM area and a buffer RAM data CRC area. The N64 write flag assumes "1" when the video game machine 20 writes 32-byte data and check sum data respectively to the buffer RAM area and the buffer RAM data CRC area, and "0" when the portable game machine 10 reads 32-byte data and check sum data respectively from the buffer RAM area and the buffer RAM data CRC area.

The GB communication port write flag assumes "1" when the portable game machine 10 writes GB communication port data to the GB communication port area, and "0" when the video game machine 20 reads GB communication port data out of the GB communication port area. The N64 communication port write flag assumes "1" when the video game machine 20 writes N64 communication port data to the N64 communication port area, and "0" when the portable game machine reads N64 communication port data out of the N64 communication port area.

The general-purpose flag 0 is used as a transfer cancel flag from the portable game machine 10, and the general-purpose flag 1 is as a transfer cancel flag from the video game machine 20. The buffer RAM data CRC error flag assumes "0" when the check sum data received from the video game machine 20 is normal, and "1" when it represents an error. The N64 recording-send flag assumes "1" when requested from the video game machine 20 to re-send status data.

The N64 detect flag assumes "1" when recognizing supply of power to the video game machine 20, and "0" when not recognizing supply of power. That is, if the communication cable 30 when the video game machine 20 is powered on is good in connection state, the N64 detect flag assumes "1". On the other hand, if the communication cable 30 when the video game machine 20 is powered on is poor in connection state, the N64 detect flag assumes "0". Poor connection occurs principally in a case that the communication cable 30 is being removed from the connector 23b.

Note that the portable game machine 10 is not limited to a type that a game cartridge 15 is to be freely loaded and unloaded. Alternatively, it may be a type incorporating a ROM 15a, RAM 15b and a communication control circuit 15c to have a connector provided integral with a housing so that the backup data stored in the RAM 15b can be directly or indirectly transferred through a code or the like.

Also, in place of the ROM 15a, a large capacity RAM (S-RAM) may be provided to prevent data from vanishing due to a battery wherein part of the S-RAM is used as a corresponding program area to the ROM 15a and the remaining area is as corresponding backup data area (temporary storage area) to the RAM 15b. In such a case, a game program for the portable game machine may be previously stored in a ROM 25a, hereinafter stated. When starting a game (a single game for the portable game machine or combined game with using the video game machine), the connector 30A of the portable game machine 10 is checked for connection to the connector 23b on the video game machine 20. In response to a request of transferring the program from the portable game machine 10 wherein the connectors 30A and 23b are connected, a portable game machine program stored on the ROM 25a is transferred to the portable game machine 10 and stored onto a program area of a RAM (corresponding to the RAM 15a) of the cartridge 15.

Furthermore, in place of the cartridge 15 (external storage medium) including the ROM 15a and RAM 15b, a large capacity RAM (which may be provided in the portable game machine 10 (may be used also as a built-in RAM 16) may be provided in the portable game machine 10 so that the RAM can be used both as a program area and a backup data area. The program area may be provided rewritable, by updating, with program data for a desired program.

Explanations will now be made in detail on the video game machine 20 constituting for a combined game system 100 as well as on a game cartridge 25 used thereon. As shown in FIG. 2, the video game machine 20 includes a CPU, for example, of 64 bits. The CPU 21 is connected with an input/output interface (hereinafter referred to as "I/O") 22. To the I/O 22 are connected a connector 23a to connect a game cartridge 25 for the video game machine and a connector 23b to connect an operating device (or controller) 24. Incidentally, the cartridge 25 is removably connected to the connector 23a.

The game cartridge 25 incorporates, in a state mounting on a substrate (not shown), a non-volatile memory (e.g. ROM, EP-ROM, etc.; referred to as "ROM") 25a storing a game program for the video game machine 20, and a writable and readable memory (e.g. RAM, EP-ROM, etc.; referred to as "RAM") 25b storing unit-related information. Also, the substrate has a plurality of terminals formed on a certain one of sides so that the terminals are to be electrically connected removably to the connector 23a.

The ROM 25a is a ROM larger in capacity than the ROM 15a, and includes a video game machine program area to store a game program for the video game machine. This program area previously stores a key input signal receive program to receive key input signal to the operating device 14 of the portable game machine 10, a unit processing program to process the "unit" stated before, a unit information transfer program to transfer information on the unit processed by the video game machine 20 to the portable game machine 10, and a display program to display a common game picture in three dimensions on the CRT 40 according to the unit information processed by the video game machine 20. Note that the ROM 25a is formed, as required, with areas to store other programs.

The RAM 25b has a storage capacity several times greater than a storage capacity of the RAM 15b, and can store information about all the units of all the portable game machines 10 being connected to the video game machine 20.

Alternatively, another information storage medium, e.g. a CD-ROM or magnetic disk, may be utilized in place of the game cartridge 25 as above.

The video game machine 20 has another connector 23b. To this connector 23b are connected respective connectors 30A, . . . , 30A of the communication cables 30, . . . , 30 mentioned before. Accordingly, the game cartridge 15 on each portable game machine 10 is connected to the CPU 21 through the connector 30A of communication cable 30 and the connector 23b. Incidentally, in FIG. 2 explanation was made that the connectors 30A of plurality in number are connected to the one connector 23b. Alternatively, the connector 23b may be arranged so as to connect only one connector 30A so that such connectors 23b be provided in equal number to the number of connectable portable game machines 10 to the video game machine 20.

Furthermore, the CPU 21 is connected with a RAM 26 used as a working RAM or the like, and with an image processing unit (RCP) 27.

The RAM 26 includes a unit information storage area to store related information to the units on all the portable game machines 10 being connected to the video game machine 20, in order to display a common game picture on the CRT 40. On the unit information storage area the display coordinate positions (X, Y, Z), kinds and states concerning all the units. The kind of unit represents what the relevant unit represents, e.g. a player, a player object, an enemy object, an item or the like. The state of unit is corresponding data in various kinds to a relevant unit no, e.g. an object HP (Hit Points), MP, level of player object or the like.

The RAM 26 further includes storage areas respectively assigned to the portable game machines 10. These storage areas store information on the corresponding game titles or the like to the portable game machines 10, . . . , 10 in number connectable to the video game machine 10, and other unit information. Here, the other unit information is data for each portable game machine that is required to provide common display in conducting an interactive game with the video game machine 20. For the role playing game, it may be stage numbers representative of a state of game progression on each portable game machine 10, the kinds and number of items possessed by players, and so on. Where the game in kind is a card game, it may be the kinds and number of cards (hand) possessed by players on the portable game machines, the kinds of discarded cards immediately before, and the like. For a race horse raising game, it may be data representative of an attribute (feature) of a horse selected to run a horse race, and the like.

The RCP (image processing unit) 27 is connected with a video RAM 28. The video RAM 28 has a storage area to store corresponding color data in red (R), green (G) and blue (B) to dots of a picture on a raster scan display 40, where color-display data is written to and/or read out under control of the RCP 27. The color data read out of the video RAM 28 is converted into analog R, G and B signals and/or into composite video signals by an encoder and/or composite video signal generating circuit 29, thus being supplied to the CRT 40.

Figure 6:
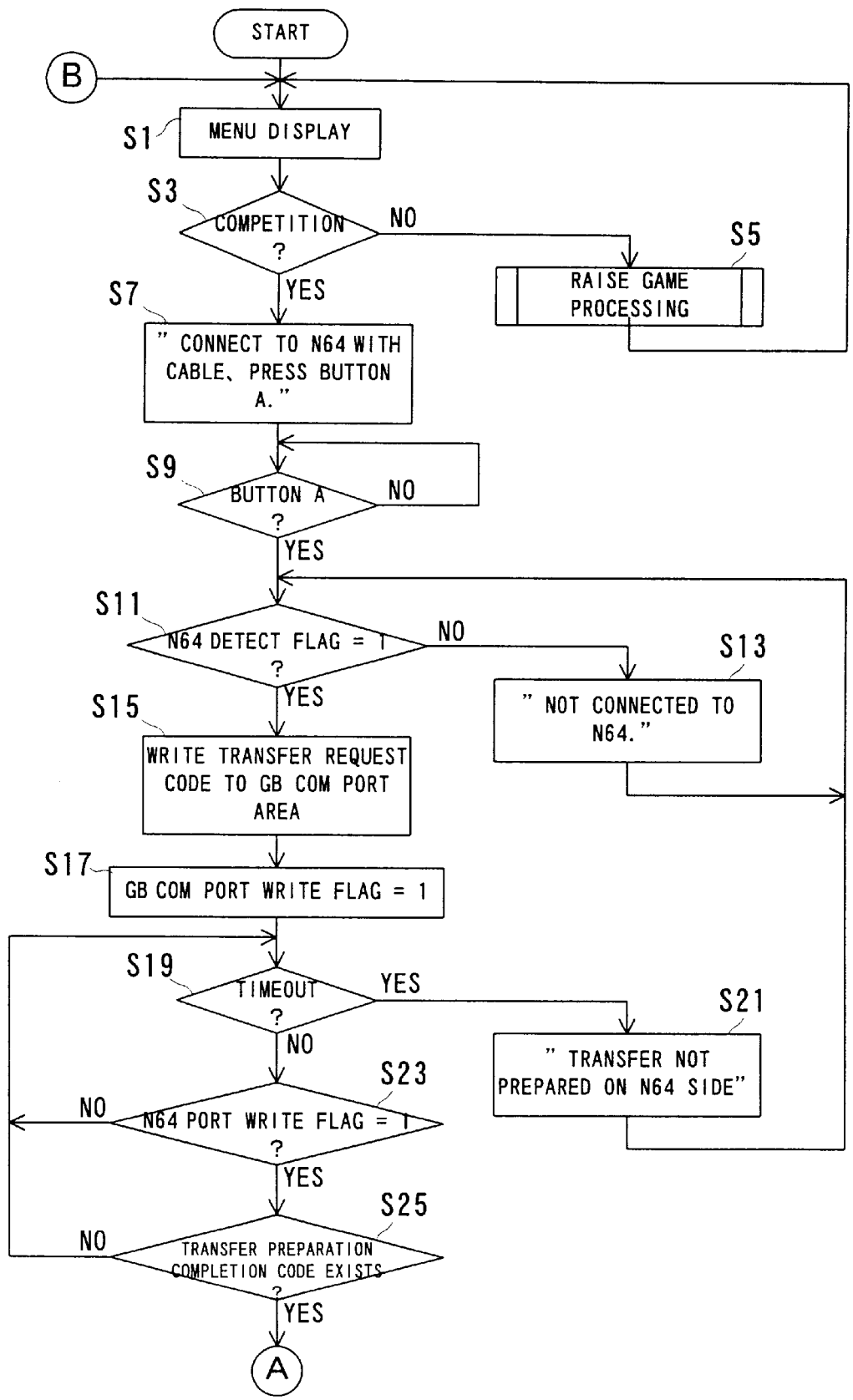
FIG. 6 is a flowchart showing a part of operation of the FIG. 1 embodiment.
Figure 7:
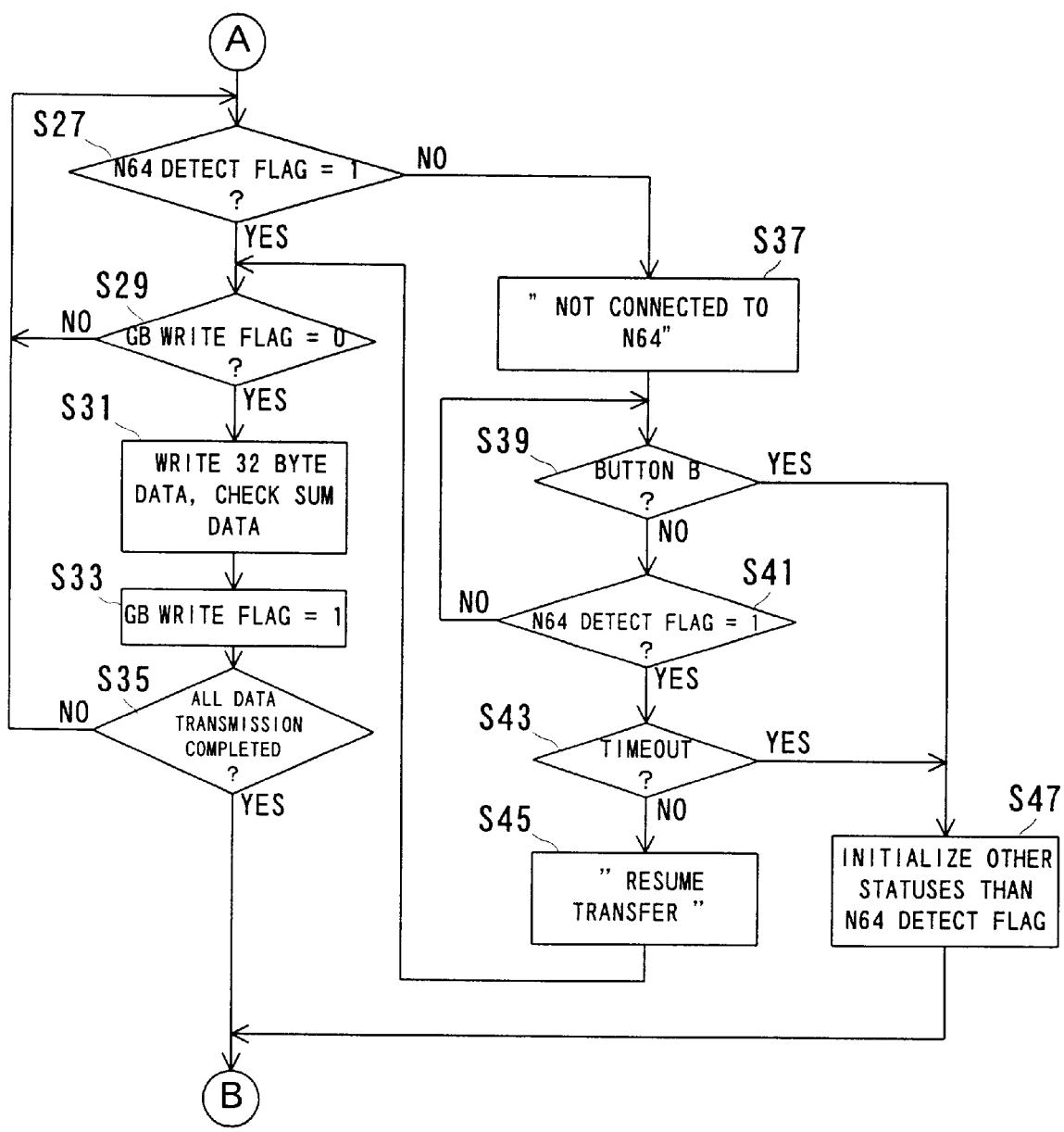
FIG. 7 is a flowchart showing another part of operation of the FIG. 1 embodiment.
Figure 8:
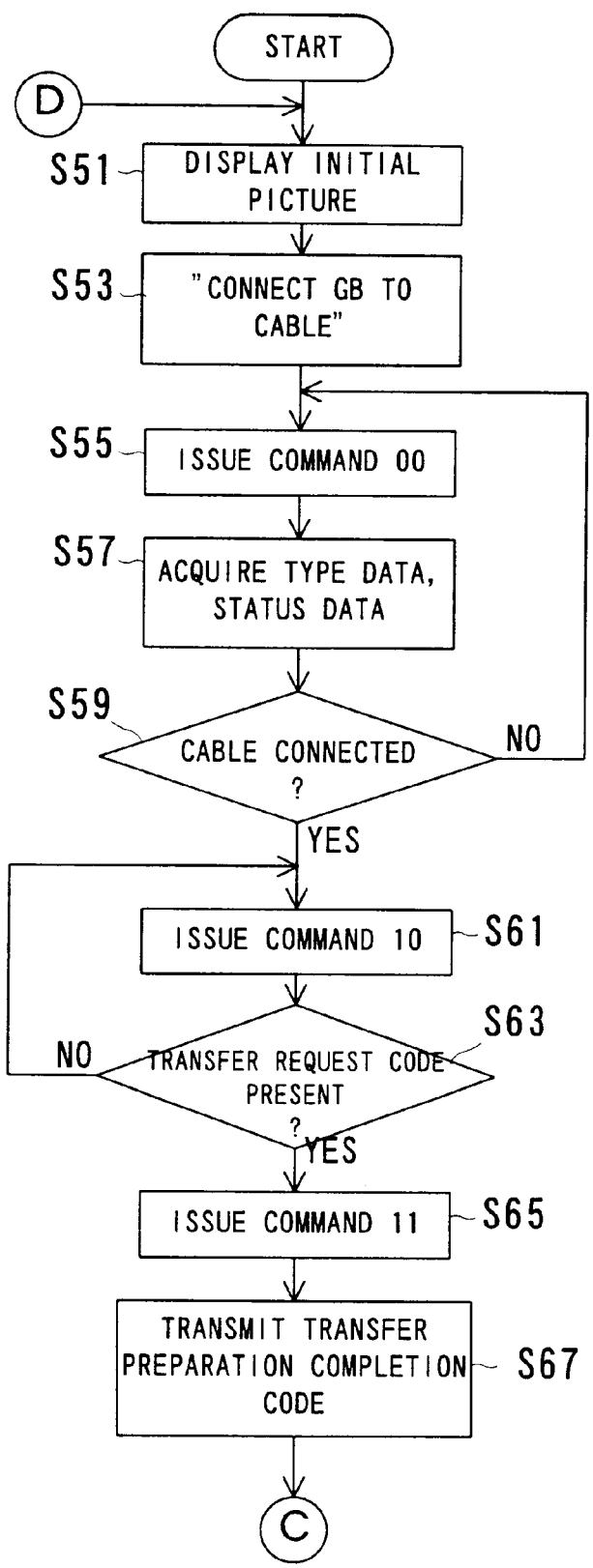
FIG. 8 is a flowchart showing still another part of operation of the FIG. 1 embodiment.
Figure 9:
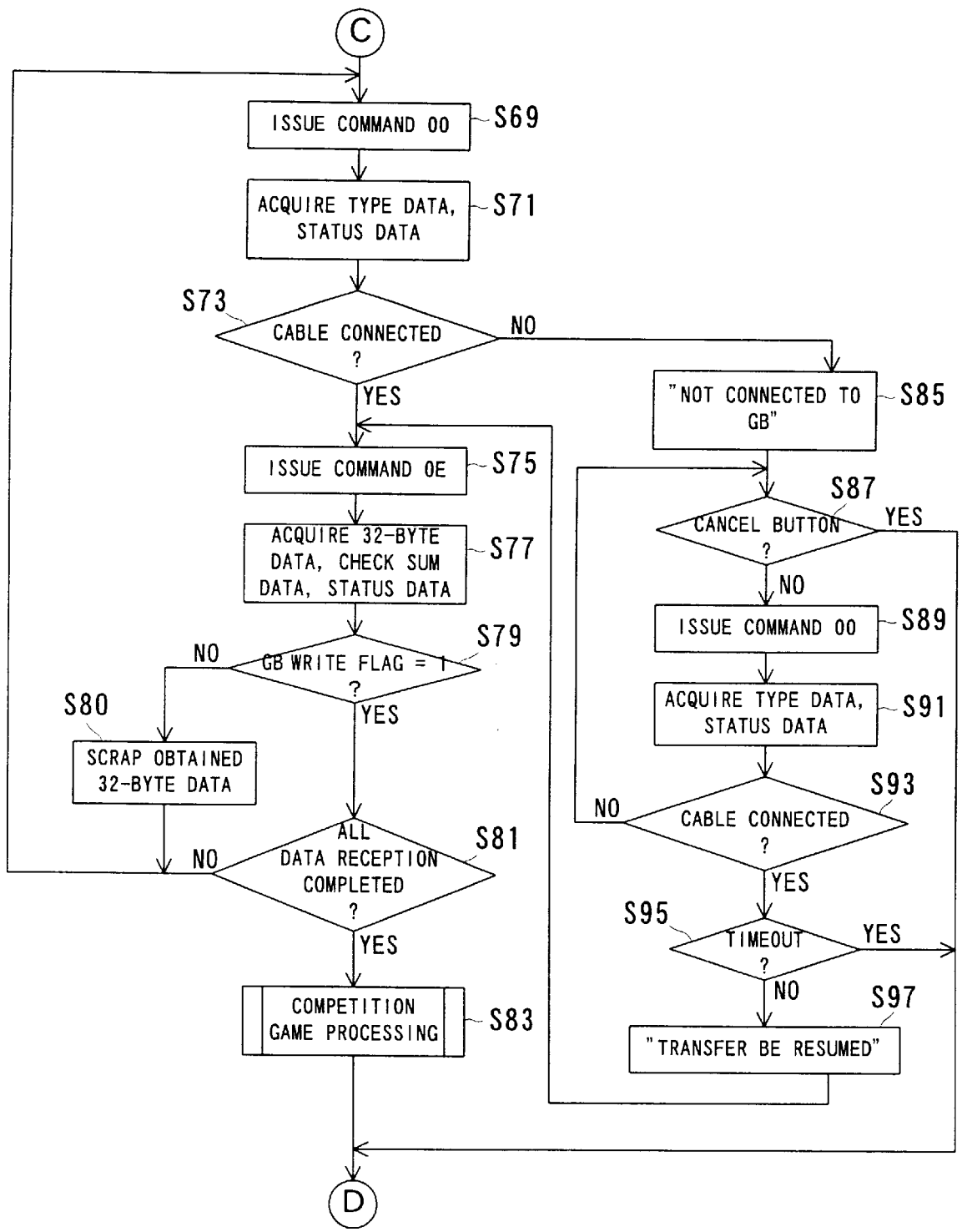
FIG. 9 is a flowchart showing yet another part of operation of the FIG. 1 embodiment.

When a game is played using only one portable game machine 10 of the four portable game machines 10 being connected to the video game machine 20 (the remaining portable game machines 10, . . . , 10 are out of connection), the portable game machine 10 processes a flowchart shown in FIG. 6 and FIG. 7 while the video game machine 20 processes a flowchart of FIG. 8 and FIG. 9. The communication control circuit 15c processes a flowchart of FIG. 10 to FIG. 14. Note that explanation herein will be made on an assumption that a race horse is raised on the portable game machine 10 and the raised race horse is made to run a race on the video game machine 20.

Referring to FIG. 6, the CPU 11 on the portable game machine 10, in step S1, at first displays a menu including items "RACE" and "RAISE" on the LCD 17, and then in step S3 determines which one of the items has been opted. In a case the player opts "RAISE", the CPU 11 in step S3 determines "NO", and in step S5 makes processing for a raise game. When the player has ended the game, the process returns to the step S1. Depending upon a way of raising a horse in step S5, determined are a running ability (running head to the end or last spurt, etc.) and a favorite environment (e.g. what state of a race course is favorite of a heavy racecourse, a lawn racecourse, a dirt racecourse, etc., or which is favorite of a right-hand course or a left-hand course, or a presence or absence of a slope).

If the player in step S1 opts "race", the CPU 11 advances from step S3 to step S7 to display a guide message "CONNECT TO N64 WITH CABLE AND PRESS BUTTON A " on the LCD 17.

In response, if the player presses the button A 14a, the CPU 11 in step S9 determines "YES". The CPU 11 in step S11 accesses the RAM bank 40 to determine a state of the N64 detect flag. If the N64 detect flag represents "0", the CPU 11 determines that the communication cable 30 is not connected to the video game machine 20, and in step S13 displays an alert message "NOT CONNECTED TO N64" on the LCD 17, then returning to the step S11. When the communication cable 30 is connected to N64, i.e. the connector 30A is connected to the connector 23b, and hence the N64 detect flag represents "1", the CPU 11 advances to step S15 to write GB communication port data including a transfer request code to the GB communication port area in the RAM bank 40. Furthermore, in step S17 the GB communication port write flag in the status area is rendered "1".

The CPU 11 subsequently, in step S19, determines whether timeout has occurred, i.e. whether a predetermined time has elapsed or not after setting the GB communication port write flag to "1". If "NO" here, the CPU 11 in step S23 determines a state of the N64 communication port write flag in the status area, and in step S25 determines whether a transfer preparation completion code is written on the N64 communication port area or not. Even where the N64 communication port write flag is "0" or the N64 communication port write flag is "1", if a transfer preparation completion code is not written on the N64 communication port area, the process returns to step S19 to repeat a same process. If timeout occur in this state, the CPU proceeds from step S19 to step S21 to display an alert message "TRANSFER NOT PREPARED ON N64 SIDE" on the LCD 17, returning to the step S11. On the other hand, if before occurring timeout the N64 communication port write flag becomes "1" and a transfer preparation completion code is written to the N64 communication port area, then the CPU 11 advances to step S27.

That is, data communication is made possible to implement when the N64 detect flag represents "1" and further a transfer request code and transfer preparation completion codes are written respectively to the GB communication port area and the N64 communication port area.

In step S27 is determined a state of the N64 detect flag in the status area, and in the subsequent step S29 is determined a state of the GB write flag. If the N64 detect flag is "1" and the GB write flag is "0", then the communication cable 30 is good in connection state so that data can be written to the buffer RAM area and buffer RAM data CRC area. Consequently, the CPU 11 in step S31 writes 32 bytes of game processing data (data of a raised race horse) to the buffer RAM area. Then, in step S33 the GB write flag is set to "1". In step S35 it is determined whether all of the game processing data have been transmitted or not. If "NO", the process returns to step S27 to repeat the same process. Note that the game processing data is greater in data amount than a capacity of the buffer RAM area (32 bytes).

In this manner, the data of the raised race horse is written by 32 bytes a time onto the RAM bank 40 only when the GB write flag is "0". That is, the process of data writing is enabled when the write flag equal 0 and disabled when the GB write flag equal 1. The data written on the RAM bank 40 is transmitted to the video game machine 20 by the communication control circuit 15c.

In an event that poor connection occur on the communication cable 30 during transmitting data, the N64 detect flag is set to "0". At this time, the CPU 11 proceeds from step S27 to step S37 to display on the LCD 17 an alert message "NOT CONNECTED TO N64". Furthermore, in step S39 whether the button B 14b has been pressed or not is determined. In step S41 whether the N64 detect flag is "1" or not is determined, and in step S43 whether timeout has occurred or not (whether a predetermined time has elapsed after turning the N64 detect flag to "0" or not ) is determined.

If the player presses the button B 14b, the CPU 11 in step S47 initializes the statues of other than the N64 detect flag, and returns to step S1. Even where the player re-connect the communication cable 30 and the N64 detect flag is set at "1", if timeout once occurs, a same process is made in step S47 and the process returns to step S1. On the contrary, if the N64 detect flag becomes "1" before the occurrence of timeout, the CPU 11 in step S45 displays on the LCD 17 a return message "TRANSFER BE RESUMED", then returning to step S29.

Referring to FIG. 8, the CPU 21 on the video game machine 20, at first in step S51, displays an initial picture on the CRT 40, and then in step S53 OSD-displays a guide message "CONNECT GB TO CABLE" on the initial picture. The CPU 21 subsequently in step S55 transmits a command 00 (type/status request command) to the communication control circuit 15c, and in step S57 acquires type and status data from the communication control circuit 15c. In step S59, the communication cable 30 is determined in its connection state depending upon whether the acquired type data has a predetermined device no. or not. If the type data does not have predetermined device no., the CPU 21 determines that there is poor connection occurring on the communication cable 30, returning to step S55. On the contrary, if the type data has a predetermined device no., the CPU 21 determines that the communication cable 30 is in a good connection state, thus advancing to step S61.

In step S61, a command 10 (command to read data out of the GB data communication port area) is issued, and in the succeeding step S63 it is determined that the GB communication port data sent back from the communication control circuit 15c has a transfer request code or not. If the GB communication port data does not include a transfer request code, the process of step S61 is repeated. On the other hand, if the GB communication port data includes a transfer request code, then in step S65 a command 11 (command to write data to the N64 data communication area) is issued and further in step S67 is transmitted an N64 communication port data including transfer preparation completion code. This completes the preparation for transferring game processing data.

The CPU 21 thereafter in steps S69 to S73 performs a similar process to that of steps S55 to S59, thereby determining whether there is poor connection occurring on the communication cable 30 or not. If the connection state is good, a command 0E (command to read data from the buffer RAM area) is issued, followed by obtaining 32-byte data, check sum data and status data from the communication control circuit 15c. Furthermore, in step S79 is determined a state of the GB write flag contained in the acquired status data. Here, if GB write flag=1, the process proceeds to step to S81. However, if GB write flag=0, the acquired 32-byte data is done away in step S80 and the process returns to step S69.

That is, according to the above steps S31 and S33, after writing the 32-byte data the GB write flag is set to "1". Accordingly, the GB write flag of the status data acquired in step S77 also should assume "1". In other words, if the GB write flag is "0", the acquired 32-byte data and check sum data are not correct data. Consequently, when "NO" is determined in step S79, in step S80 the 32-byte data is abandoned.

In step S81 it is determined whether all the data has completed of reception or not. If "NO", the process returns to step S69 while if "YES" then in step S83 a race game processing is executed. That is, by repeating the process of step S77 a horse race is played on the CRT 40 according to the acquired data of a race horse. When the race game is ended, the CPU 21 returns to step S51.

If it is determined in step S73 that poor connection occurred on the communication cable 30, the CPU 21 in step S85 displays an alert message "NOT CONNECTED TO GB" on the CRT 40. In response, if the player manipulates a cancel button (not shown) on the video game machine 20, the CPU 21 in step S87 determines "YES" and the process directly returns to step S51. As a result, as a game is initialized in the course of data transfer. On the other hand, if the cancel button is not pressed by the player, the CPU in step S87 determines "NO" and in steps S89 to S93 carries out a similar process to that of steps S55 to S59.

If the communication cable 30 is eliminated of poor connection and the cancel button is not pressed, the CPU 21 repeats a process of steps S87 to S93. If the poor connection is eliminated, the CPU 21 advances to step S95 to determine whether timeout occurred or not, in other words, whether communication has been resumed in a predetermined time from eliminating the poor connection. If no timeout occurred herein, the CPU 21 proceeds to step S97 to display a return message "TRANSFER BE RESUMED" on the CRT 40, returning to step S75. On the other hand, when timeout occurred, the CPU 21 returns to step S51. That is, the game progression is returned to the initial state.

Explanation will be made on the operation of the communication control circuit 15c received with various commands as above. Note that the communication control circuit 15c although actually configured by hardware will be explained on operation using a flowchart, for the sake of convenience.

Figure 10:
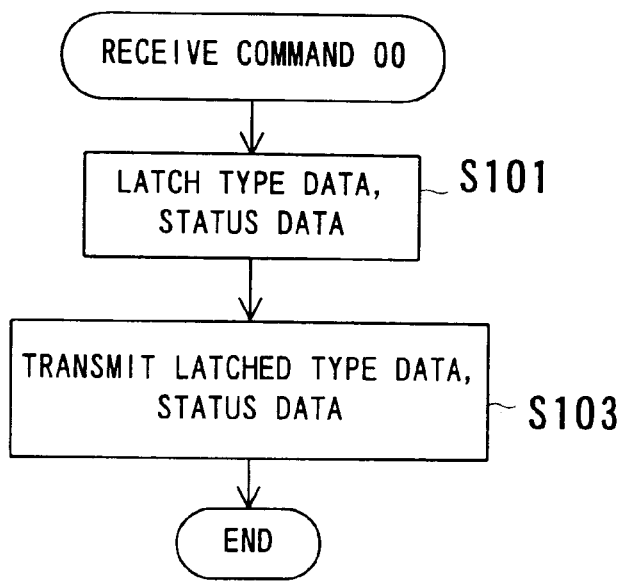
FIG. 10 is a flowchart showing another part of operation of FIG. 1 embodiment.

Referring to FIG. 10, when receiving a command 00 (type/status data request command) type data and status data are latched in step S101 and then the latched type and status data in step S103 are transmitted to the video game machine 20. Then, the process is ended.

Figure 11:
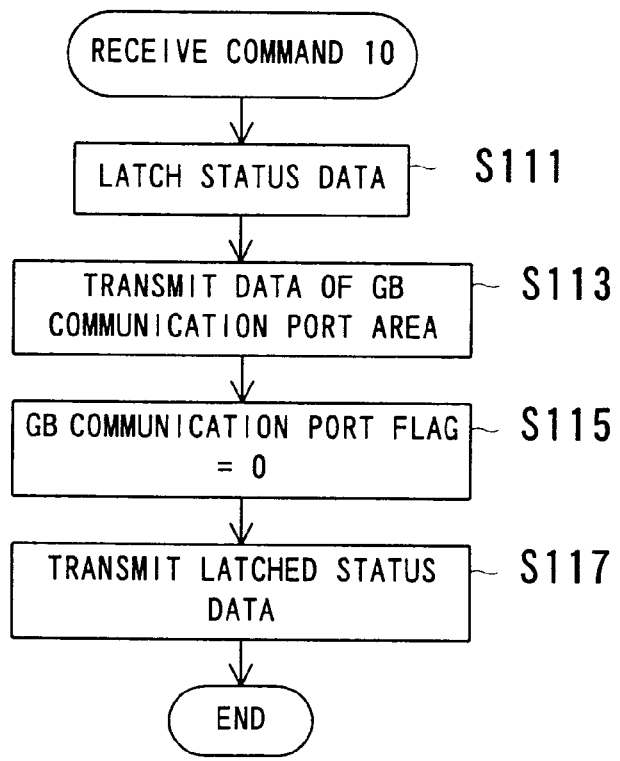
FIG. 11 is a flowchart showing still another part of operation of the FIG. 1 embodiment.

Referring to FIG. 11, when receiving a command 10 (command to read data out of the GB data communication port area), in step S1 status data is latched and in step S113 the GB communication port data written on the GB communication port area is transmitted to the video game machine 20. In step S115 the GB communication port write flag is set at "0", and the subsequent step S117 the status data latched in step S111 is transmitted to the video game machine 20. Then, the process is ended.

Figure 12:
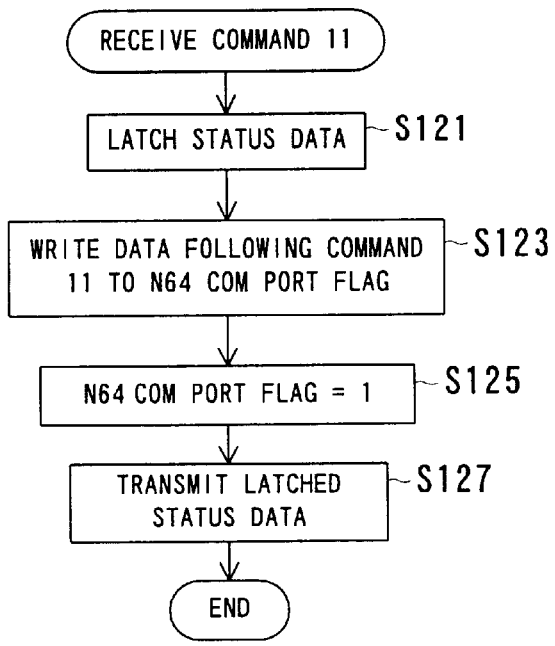
FIG. 12 is a flowchart showing yet another part of operation of the FIG. 1 embodiment.

Referring to FIG. 12, when receiving a command 11 (command to write data to the N64 data communication port area), in step S121 status data is latched, and in step S123 the N64 communication port data received following the command 11 is written to the N64 communication port area. Completing the writing, in step S125 the N64 communication port write flag is set at "1" and in step S127 the status data latched in step S121 is transmitted to the video game machine 20.

Figure 13:
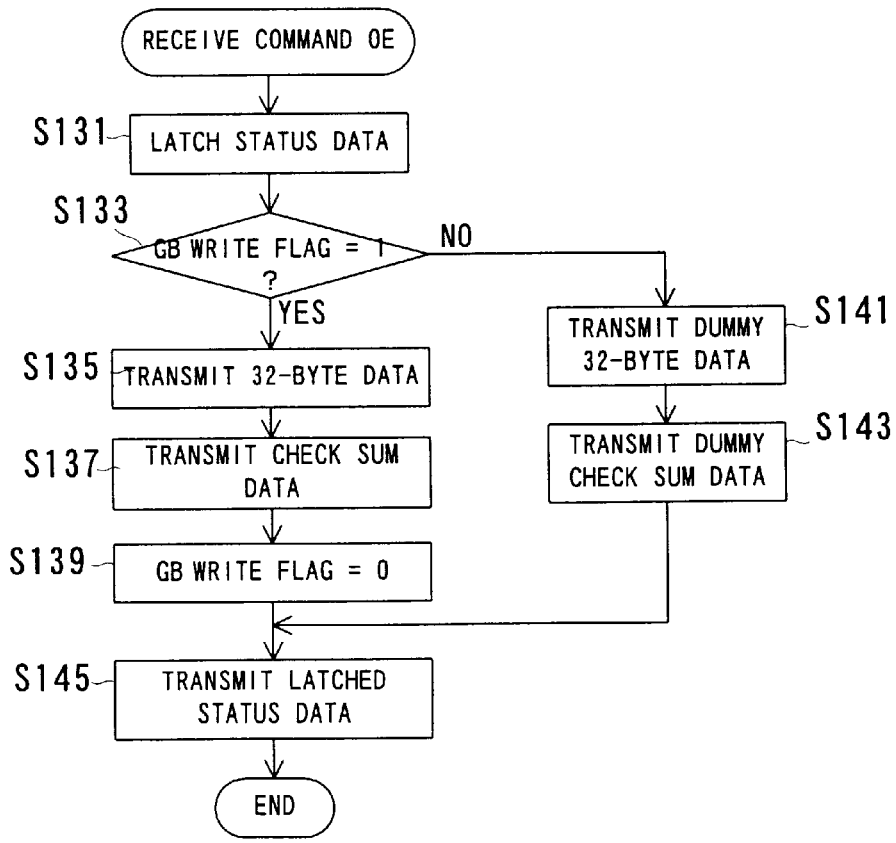
FIG. 13 is a flowchart showing another part of operation of the FIG. 1 embodiment.
Figure 14:
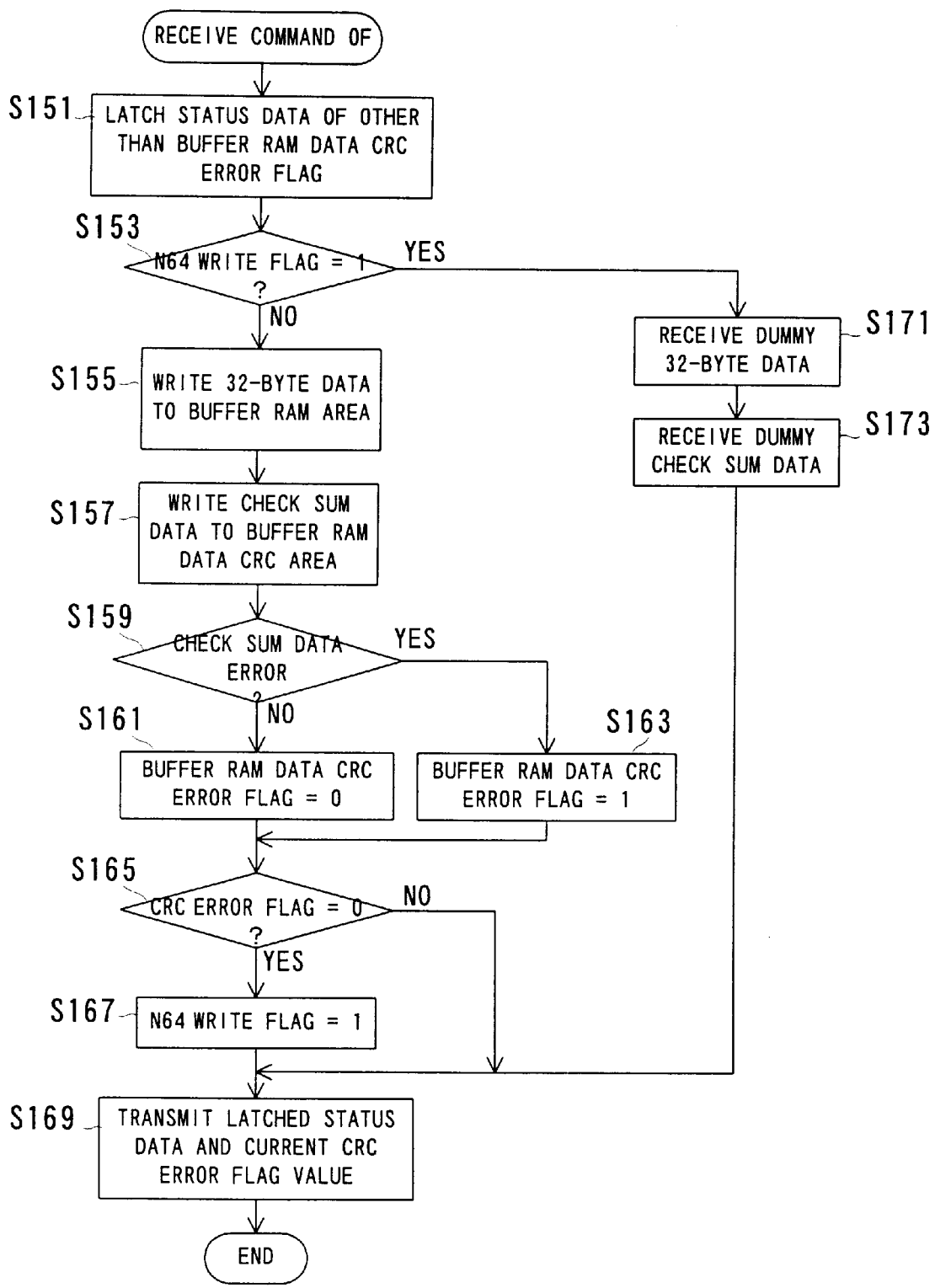
FIG. 14 is a flowchart showing still another part of operation of the FIG. 1 embodiment.

Referring to FIG. 13, when receiving a command 0E (command to read data out of the buffer RAM area), in step S131 status data is latched and in step S133 is determined a state of the GB write flag contained in the status data. Here, if GB write flag=1, it is judged at 32 bytes of transmission data is written on the buffer RAM area. In step S135 the 32-byte data is transmitted to the video game machine 20. Also, the check sum data written on the buffer RAM data CRC area (CRC calculation result of the above 32-byte data)

is transmitted to the video game machine 20. Completing the transmission, in step S139 the GB write flag is set to "0", and the process advances to step S145.

On the other hand, if determination is made in step S133 as GB write flag=0, in steps S141 and S143 dummy 32-byte data and dummy check sum data are transmitted to the video game machine 20, and the process proceed to step S145. In step S145, the status data latched in step S131 is transmitted to the video game machine 20, thereafter the process is ended.

According to the above processing, the portable game machine 10 determines whether or not poor connection occurred on the communication cable 30 each time 32 byte race horse data (game processed data) is written to the RAM bank 40. In an event that poor connection occur, an alert message "NOT CONNECT TO N64" is displayed on the LCD and the writing of 32-byte data to the RAM bank 40, or data transmission, is interrupted. Thereafter, if the poor connection is eliminated in a predetermined time, a return message "TRANSFER BE RESUMED" is displayed on the same LCD 17 thus resuming a data transmission processing.

The video game machine 20 also determines whether poor connection occurred on the communication cable or not each time reading 32-byte race horse data out of the RAM bank 40. If poor connection occurred, an alert message "NOT CONNECTED TO GB" is displayed on the CRT 40 and the reading of 32-byte data out of the RAM bank 40, or data reception, is interrupted. If the poor connection is eliminated in a predetermined time, a return message "TRANSFER BE RESUMED" is displayed on the same CRT 40 thus resuming a data receiving processing. In this manner, because an alert message is displayed on both the LCD 17 and the CRT 40 upon occurring of poor connection, the player is readily and immediately known of occurrence of poor connection.

Meanwhile, the portable game machines 10 when the GB write flag is "0" writes 32-write data to the buffer RAM area and sets GB write flag to "1". While the GB write flag is "1", the next 32-byte data will not be written to the buffer RAM area. On the other hand, the video game machine 20 enables the 32-byte data having been transmitted from the portable game machine 10 only when the GB write flag represents "1". Thus, effective 32-byte data only is used for race game processing. That is, if the GB write flag received together with the 32-byte data is "0", the 32-byte data is disabled. In this manner, when the GB write flag is "0", 32-byte data is written to the buffer RAM area and the GB write flag is rendered "1" so that the 32-byte data transmitted together with the GB write flag taking "1" is rendered effective. Accordingly, the reliability of data transfer is improved.

In the above game of raising a race horse and the raised race horse is made run a race, the 32-byte data and check sum data were transferred merely from the portable game machine 10 to the video game machine 20. However, in the composite game system 10 of this embodiment, it is possible to transfer 32-byte data and check sum data from the video game machine 20 to the portable game machine 10.

In this case, the video game machine 20 issues a command 0F (command to write data to the buffer RAM area) and subsequently transmits 32-byte data and check sum data. The communication control circuit 15c received with the command 0F processes a flowchart shown in FIG. 14.

First, in step S151 the other status data than of the buffer RAM data CRC error flag is latched, and then in step S153 a state is determined on an N64 write flag contained in the status data. If N64 write flag=0, writing is possible to the buffer RAM area and buffer RAM data CRC area. Consequently, the communication control circuit 15c in respective steps S155 and S157 writes the 32-byte data and check sum data following the command 0F to the buffer RAM area and buffer RAM data CRC area. Subsequently, it is determined in step S159 whether the check sum data written to the buffer RAM data CRC area represents an error or not. If the check sum data is normal, in step S161 the buffer RAM data CRC error flag is rendered "0". If the check sum data represents an error, in step S163 the buffer RAM data CRC error flag is rendered "1".

In the subsequent step S165 is determined a state of the buffer RAM data CRC error flag. If the CRC error flag is "1", the process directly advances to step S169. If this CRC error flag is "0", in step S167 the N64 write flag is set to "1" and then the process proceeds to step S169. In step S169, the status data latched in step S151 and buffer RAM data CRC error flag in the present value are transmitted to the video game machine 20. On the other hand, if N64 write flag=1 is determined in step S153, dummy 32-byte data and dummy check sum data are received-processed respectively in steps S171 and Ss173. Then process proceeds to step S169.

That is, if the N64 write flag is "1" at a time that the command 0F is issued, the 32-byte data and buffer RAM data following the command 0F cannot be written to the buffer RAM area and buffer RAM data CRC area. Also, even where the N64 write flag is "0", if the check sum data represents an error (i.e. the buffer RAM data CRC error flag is "1"), then the 32-byte data is not correct. In such a case, in order to re-transmit a same one of data from the video game machine 20, status data and a current CRC error flag value are transmitted to the video game machine 20 at a time of receiving a command 0F.

The video game machine 20 acquires status data (including a CRC error flag) transmitted from the communication control circuit 15c, and enters to a transmission process for the next 32-byte data only when both the N64 write flag and CRC error flag represent "0". That is, if even any one of the N64 write flag and the CRC error flag represents "1", the last-time transmission process is determined as failure and a same one of 32-byte data is transmitted again. On the other hand, the portable game machine 10 reads 32-byte data out of the buffer RAM area when the N64 write flag represents "1" and the buffer RAM data CRC error flag shows "0". When the reading-out completes, the N64 write flag is set to "0".

Figure 15:
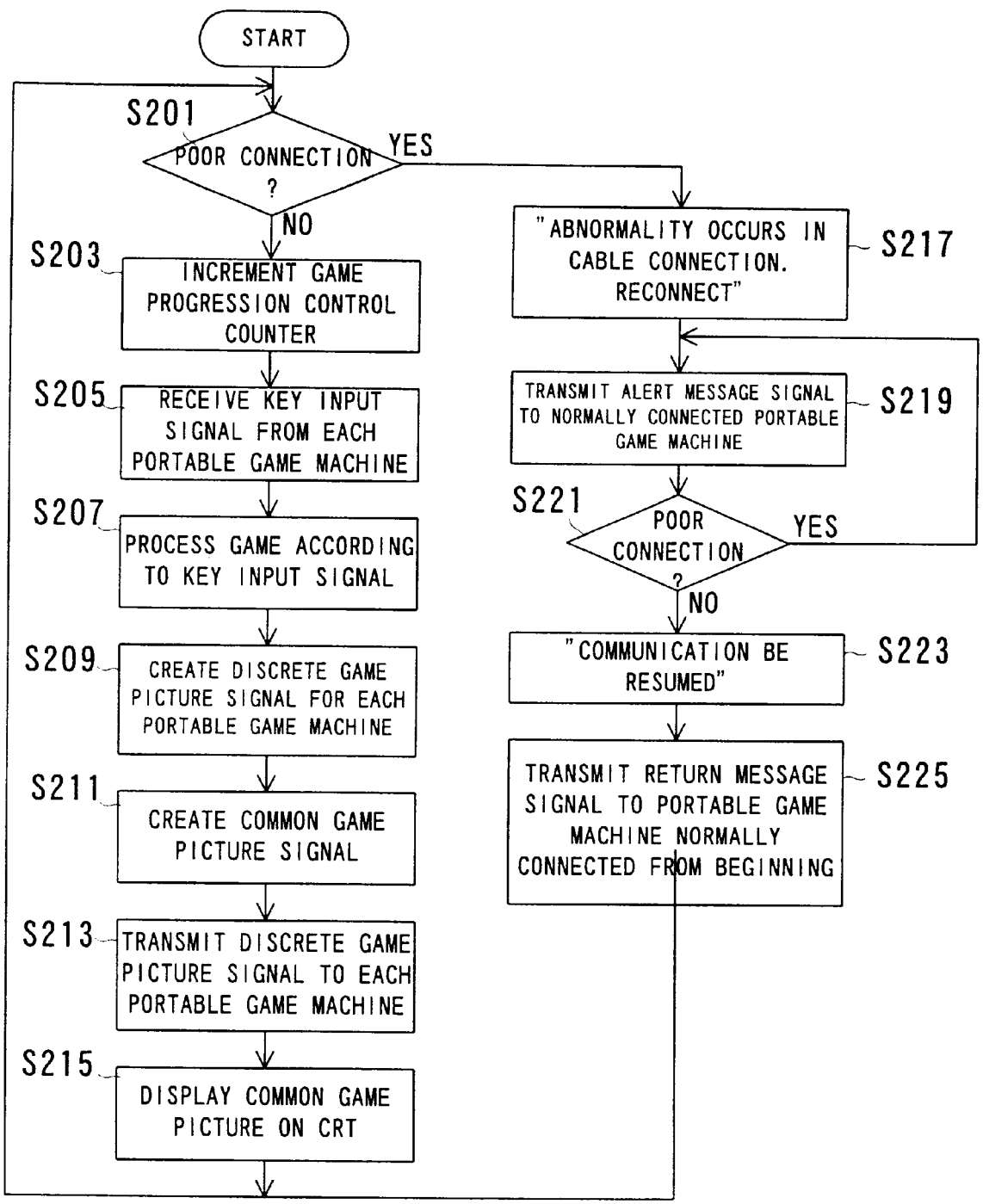
FIG. 15 is a flowchart showing yet another part of operation of the FIG. 1 embodiment.
Figure 16:
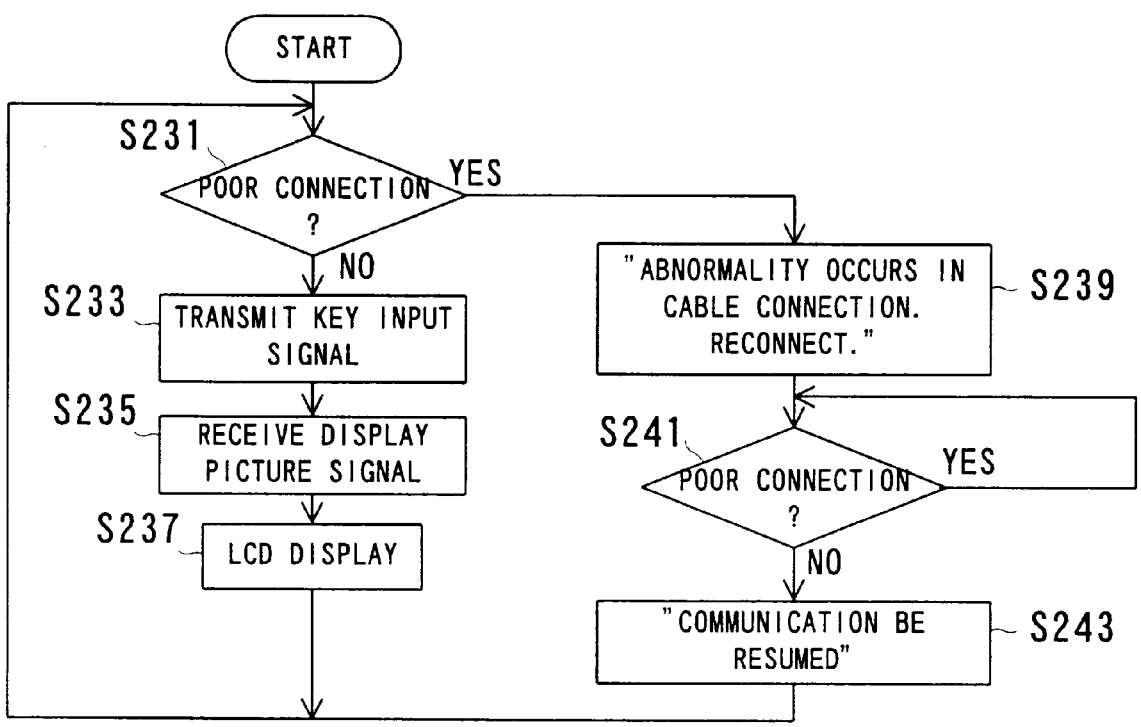
FIG. 16 is a flowchart showing another part of operation of the FIG. 1 embodiment.

When a game is played using four portable game machines 10, . . . , 10 connected to the video game machine 20, processing for the game is made between the video game machine 20 and the portable game machines 10, . . . , 10 according to a flowchart shown in FIG. 15 and FIG. 16.

Incidentally, the games to which the flowchart of FIG. 15 and FIG. 16 is applicable include a mahjong game. In such a case, the portable game machine 10 displays on the LCD 17 symbols of each player's piece hand (pieces not to be seen by the other players) as a discrete game picture, together with displaying a cursor to opt a piece to discard or the like. On the other hand, the CRT 40 displays a common picture of filed pieces, discarded pieces in a communication area, rotation of the players, and the like.

Referring to FIG. 15, the CPU 21 of the video game machine 20 at first determines in step S201 whether there is poor connection occurring on each communication cable 30 or not. Herein, a similar processing to that of steps S55 to S59 is made to and from each communication control circuit 15c, . . . , 15c. If the connection state is good, the CPU 21 in step S203 increments a game progression control counter.

Subsequently, in step S205 a similar process is made to that of steps S75 to S79 thereby receiving key input signals from all the portable game machines 10, . . . , 10. In step S207 a game processing is executed according to the received key input signals. Based on a game processing result, in step S209 a discrete game picture signal is created to be displayed on the LCDs 17, . . . , 17 of the portable game machines 10, . . . , 10, and in step S211 a common game picture signal is created to be displayed on the CRT 40.

Thereafter, the CPU 21 in step S213 transmits the discrete game picture signal to the portable game machines 10, . . . , 10. This transmission process is according to FIG. 14. This provides display of discrete pictures on the LCDs 17, . . . , 17 as individually required by the players. Furthermore, the CPU 21 in step S215 displays on the CRT 40 a common picture as requirement by all the players. This common picture is drawn by the RCP 27 based on a common picture signal determined in step S211. After ending the process of step S215, the CPU returns to step S201.

If it is determined in step S201 that poor connection occurred, the CPU 21 in step S217 displays on the CRT 40 an alert message "ABNORMALITY OCCURRED ON CABLE CONNECTION AND RECONNECT". This alert message is OSD-displayed on the common game screen. The CPU 21 subsequently in step S219 transmits an alert message signal to the portable game machines 10, . . . , 10 in a state of good connection. Also herein a transmission process is made according to the flowchart in FIG. 14. The portable game machines 10, . . . , 10 in good connection state display on their LCDs 17, . . . , 17 an alert message "ABNORMALITY OCCURRED ON OTHER CABLE" according to the input alert message signal.

Thereafter, the CPU 21 in step S221 determines whether the communication cable 30 in poor connection has been re-connected or not, i.e. whether poor connection has been eliminated or not. In also this case, a similar process is made to that of steps S55 to S59. If herein the poor connection still continues, i.e. if even one continue of poor connections on the communication cables 30 in plurality of number, a similar process is repeated. On the other hand, if the poor connection is completely eliminated, the CPU 21 in step S223 displays a return message "COMMUNICATION BE RESUMED" on the CRT 40, and in step S225 outputs a similar return message to the portable game machines 10, . . . , 10 having been good in connection state. The portable game machines 10, . . . , 10 received with the return message signal display a return message "COMMUNICATION BE RESUMED" on their LCDs 17, . . . , 17. The CPU 21 thereafter returns to step S201.

Referring to FIG. 16, the CPU of the portable game machine 10 in step S231 determines a connection state on the communication cable 30. This determination is made based on a value of the N64 detect flag. If the connection state is good, the CPU 11 advances to step S233 to transmit to the video game machine 20 a corresponding key input signal to key operation by the player. Furthermore, the CPU 11 in step S235 receives a display picture signal from the video game machine 20 according to the flowchart of FIG. 14, and in step S237 displays the corresponding image on the LCD 17. As a result, if the received display image signal is discrete game picture signal, the corresponding discrete game picture will be displayed. Meanwhile, if the received display picture signal is an alert message signal, displayed will be an alert message "ABNORMALITY OCCURRED ON OTHER CABLE". If the received picture signal is a return message signal, displayed will be a return message "COMMUNICATION BE RESUMED".

If the N64 detect flag is "0" because of poor connection on an own communication cable 30, the CPU 11 advances from step S231 to step S239 to display on the LCD 17 an alert message "ABNORMALITY OCCURRED ON CABLE CONNECTION AND RECONNECT". This message is displayed based on the message data stored on the own RAM 15b. In step S241 the N64 detect flag is determined of a value. If the player re-connect the communication cable 30 responsive to the alert message, then the N64 detect flag is set to "1". Thereupon, the CPU 11 in step S241 determines "YES" and in step S243 displays a return message "COMMUNICATION BE RESUMED" on the LCD 17. This return message is also displayed based on the message data stored on the own RAM 15b. The process returns to step S231.

According to the processing of FIG. 15 and FIG. 16, in an event poor connection occurred on any communication cable 30, the video game machine 20 displays on the CRT 40 an alert message "ABNORMALITY OCCURRED ON CABLE CONNECTION AND RECONNECT". The video game machine 20 also transmits an alert message signal to the portable game machines 10, . . . , 10 good in connection state. As a result, the portable game machines 10, . . . , 10 received with the alert message signal display on their LCDs 17, . . . , 17 an alert message "ABNORMALITY OCCURRED ON OTHER CABLE". Meanwhile, on the portable game machine 10 where poor connection occurred creates by itself an alert message "ABNORMALITY OCCURRED ON CABLE CONNECTION AND RECONNECT", and displays it on the LCD 17.

If thereafter the poor connection is eliminated in a predetermined time, the video game machine 20 displays on the CRT 40 a return message "COMMUNICATION BE RESUMED", and transmits a return message signal to the portable game machines 10, . . . , 10 good in connection state. The portable game machines 10, . . . , 10 receiving the return message signal display a same return message on their LCD 17, . . . , 17. Furthermore, on the portable game machine 10 where poor connection occurred creates by itself a same return message and displays it on the LCD 17.

In this manner, the alert message and return message are displayed on both the LCD 17 and CRT 40. Accordingly, each player can know easily and immediately occurrence and generation of poor connection.

Incidentally, where poor connection occurred during playing a game, the process may be by sounding an alert sound in place of or in addition to merely displaying an alert (message display). Furthermore, in such a game as utilizing a plurality of portable game machines in order for playing a competition, when a poor connection occurs on one player the other players may be suspended from proceeding the game. Such processing offers for an advantage that a player encountering a poor connection be prevented from shouldering a heavy handicap to proceed a game or suffering a harsh disadvantage in playing a game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A combined game system including a video game playing platform connected with a common display and at least one portable game playing platform having a discrete display, which platforms are, in use, connected through a communication cable to communicate data for game processing therebetween, wherein said video game platform comprises:
  a first connection problem detector to detect whether a connection problem occurred on said communication cable; and
  a first alert message display message generator coupled to said first connection problem detector, to display a first alert message on said common display when the connection problem detector detects a connection problem,
  said video game platform further comprising an output arrangement to output a data transmission request to said portable game platform, and
  said first connection problem detector detects said connection problem based upon transmission data responsive to said data transmission request from said portable game platform, and
  wherein said portable game platform comprises a second connection problem detector to detect a connection problem on said communication cable, and a second alert message display message generator to display a second alert message on said discrete display in response to detection of a connection problem by said second connection problem detector.

2. A combined game system according to claim 1, wherein at least one of said portable game platform and said video game platform further comprises a first return message display generator to display a first return message on at least one of said discrete display and said common display when the connection problem is eliminated.

3. A combined game system according to claim 1, wherein said portable game machine further comprises a flag that varies depending upon a connection state of said communication cable, and
  said first detector detects a connection problem based at least in part upon a state of said flag.

4. A combined game system according to claim 1, wherein said portable game platform further comprises a return message display generator to display a second return message on said discrete display when the connection problem is eliminated.

5. A combined game system according to claim 1, wherein said portable game platform further comprises a flag to vary depending upon a connection state of said communication cable, and said second detector performs a detection based at least in part upon a state of said flag.

6. A combined game system according to claim 1, wherein said portable game platform further comprises a key input signal creating arrangement to create a key input signal according to operation of said operation key, a first transmitter to transmit said key input signal to said video game platform, a first receiver to receive a discrete game picture signal from said video game platform, and a first display generator to display on said discrete display a picture corresponding to said discrete game picture signal, and
  said video game platform further comprises a second receiver to receive said key input signal, a second display generator to display on said common display a common game picture based upon said key input signal, a discrete game picture signal creating arrangement to create said discrete game picture signal based on said key input signal, and a second transmitter to transmit said discrete game picture signal to said portable game platform.

7. A combined game system according to claim 6, wherein said portable game platform further comprises a first storage medium to store a game program for said portable game platform, said key input signal creating arrangement creating said key input signal based upon operation of said operating key and said portable game platform game program, and
  said video game platform further comprises a second storage medium to store a video game platform game program, said discrete game picture signal creating arrangement creating said discrete game picture signal based upon said key input signal and said video game platform game program.

8. The combined game system of claim 1, having a video game platform connected with a common display and at least one portable game platform having a discrete display which platforms are connected through a communication cable to communicate data therebetween for game processing, wherein
  said portable game platform comprises:
    an operating device to play a game;
    a first processor to perform a predetermined processing according to operation of said operating device;
    a first data writer to write a first processing result of said first processor to a buffer memory;
    a first flag setter to set a first flag to a first state when said first processing result is written to said buffer memory;
    a first receiver to receive a transmission request from said video game platform;
    a first transmitter to transmit to said video game platform said first processing result and state information of said first flag in response to said transmission request;
    a second flag setter to set said first flag to a second state when said first processing result is transmitted from said buffer memory to said video game platform;
    a disabling arrangement to disable said first data writer when said first flag is in a first state; and
    an enabling arrangement to enable said first data writer when said first flag is in a second state.

9. A combined game system according to claim 8, wherein said buffer memory has a predetermined storage capacity, and said first processing result has a data amount greater than the storage capacity of said buffer memory, and said first data writer writes said first processing result by a predetermined amount at a time to said buffer memory.

10. A combined game system according to claim 9, wherein said portable game platform further comprises a first storage medium storing a portable game platform program, and said first processor processes based upon said portable game platform game program.

11. A combined game system according to claim 8, wherein
  said video game platform comprises a second transmitter to transmit said transmission request to said portable game platform, a second receiver to receive said first processing result and said first flag state information transmitted from said portable game platform, a second processor to process said first processing result when said first flag state information represents said first state, a disabling arrangement to disable said first processing result when said first flag state information represents said second state, and common game picture display generator to display on said common display a related common game picture to a second processing result of said second processor.

12. A combined game system according to claim 11, wherein said video game platform further comprises a second storage medium storing a video game platform game program, and said second processor processes based upon said video game platform game program.

13. A combined game system according to claim 8, wherein said operating device includes a transmission key to instruct transmission of said first processing result, and said data writer starts to write said first processing result in response to operation of said transmission key.

14. A combined game system, including a video game playing platform connected with a common display and at least one portable game playing platform having a discrete display, which platforms are, in use, connected through a communication cable to communicate data for game processing therebetween, wherein said video game platform comprises:

- a first connection problem detector to detect whether a connection problem occurred on said communication cable; and
- a first alert message display message generator coupled to said first connection problem detector, to display a first alert message on said common display when the connection problem detector detects a connection problem, said video game platform further comprising an output arrangement to output a data transmission request to said portable game platform, and said first connection problem detector detects said connection problem based upon transmission data responsive to said data transmission request from said portable game platform, and wherein a plurality of portable game platforms are connected respectively through plurality of communication cables to said video game platform, and said first detector detects connection problems with said plurality of portable game platforms, one portable game platform at a time.

15. A combined game system according to claim 14, wherein said video game platform further comprises an alert message signal transmitter to transmit an alert message signal to portable game platforms having a good connection state when the first detector detects a connection problem has occurred with respect to any of said plurality of portable game platforms, and each of said plurality of portable game platforms further comprises a third alert message display generator to display an alert message on said discrete display based upon said alert message signal.

16. A combined game system according to claim 15, wherein said video game platform further comprises a return message signal transmitter to transmit a return message signal to portable game platforms having a good connection state when the first detector detects that a connection problem has been eliminated with respect to said any of portable game platforms, and said portable game platform further comprises a third return message display generator to display a return message on said discrete display based upon said return message signal.

* * * * *